United States Patent [19]

Bonham, Jr.

[11] Patent Number: 4,905,473
[45] Date of Patent: Mar. 6, 1990

[54] GEOTHERMAL POWER PLANT STEAM ENTRAINMENTS REMOVAL SYSTEM AND METHOD

[75] Inventor: Enos A. Bonham, Jr., Baton Rouge, La.

[73] Assignee: Magma Power Company, San Diego, Calif.

[21] Appl. No.: 366,544

[22] Filed: Jun. 15, 1989

[51] Int. Cl.⁴ .......................... F01K 27/00; F03G 7/04
[52] U.S. Cl. .................................. 60/641.5; 210/714; 210/747
[58] Field of Search ..................... 60/641.2, 641.5; 210/170, 714, 747

[56] References Cited

U.S. PATENT DOCUMENTS

| | | | |
|---|---|---|---|
| 4,479,351 | 10/1984 | Awerbuch et al. | 60/641.5 |
| 4,522,728 | 6/1985 | Gallup et al. | 60/641.5 |
| 4,665,705 | 5/1987 | Bonham Jr. | 60/641.5 |
| 4,718,236 | 1/1988 | Awerbuch et al. | 60/641.5 |
| 4,765,913 | 8/1988 | Featherstone | 60/641.5 X |

Primary Examiner—Allen M. Ostrager
Attorney, Agent, or Firm—Albert L. Gabriel

[57] ABSTRACT

In a geothermal electric power generating plant of the type wherein a flow stream of hot geothermal brine is partially flashed to steam for turbine motive power, a system and method for removing entrained brine droplets and particulates from the flashed steam so as to protect turbine components from being fouled and damaged, and also to protect flash vessel demisters from being clogged and corroded. The hot geothermal brine is flashed to steam in flash crystallizer vessels, each of which receives the hot geothermal brine flow stream in its lower portion and has a baffle tray system in its upper portion through which the flashed steam passes. The baffle tray system provides a sinuous path for the flashed steam which produces a series of centripetal accelerations of the steam so as to centrifugally separate the entrained materials from the steam onto surface portions of the baffle tray system and wall portions of the upper portion of the flash crystallizer vessel. These separated entrained materials are flowed back down into the brine flow stream in the lower portion of the flash crystallizer vessel.

62 Claims, 11 Drawing Sheets

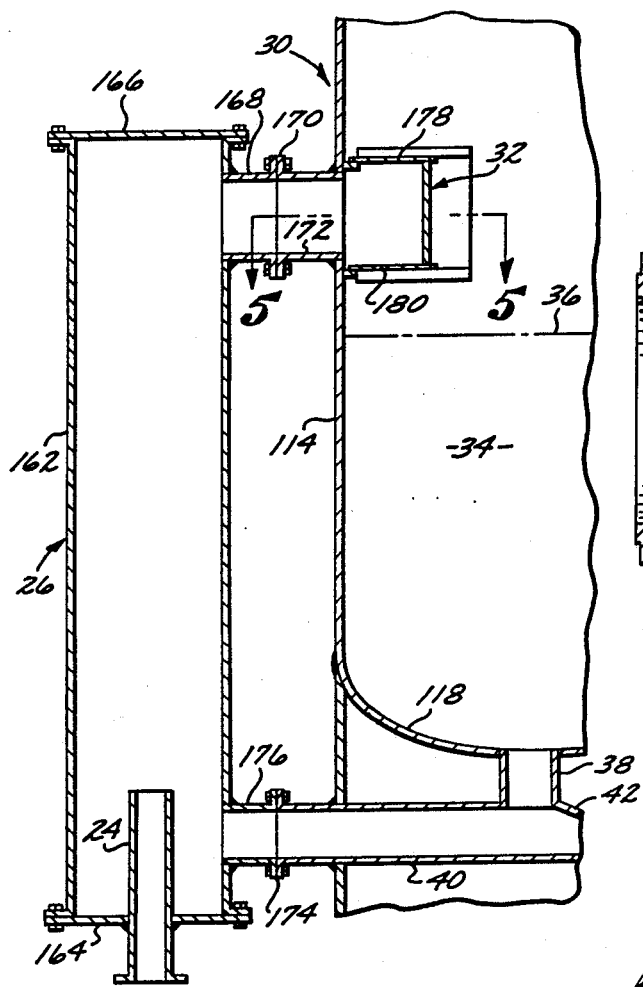
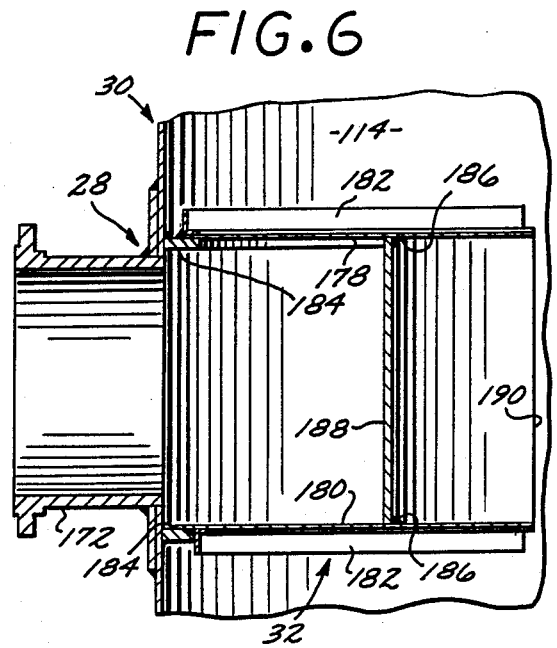
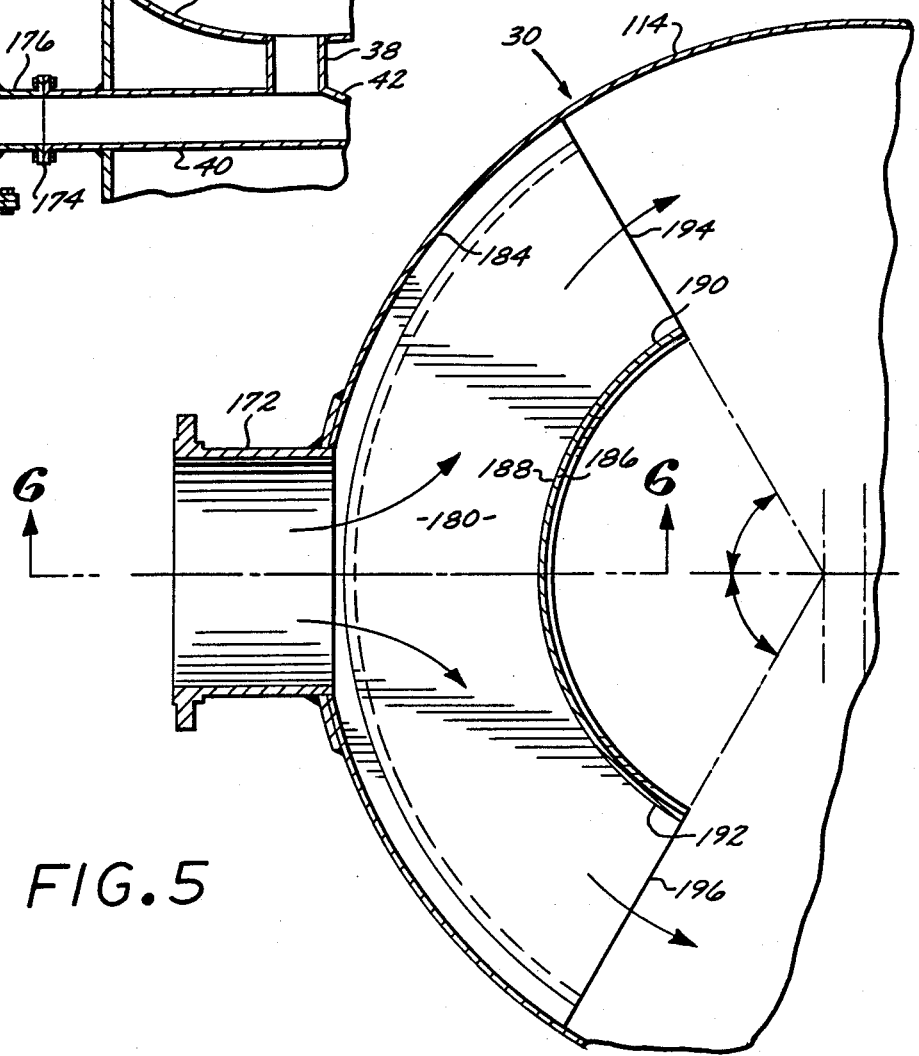
FIG.4
FIG.6
FIG.5

FIG.19
FIG.20
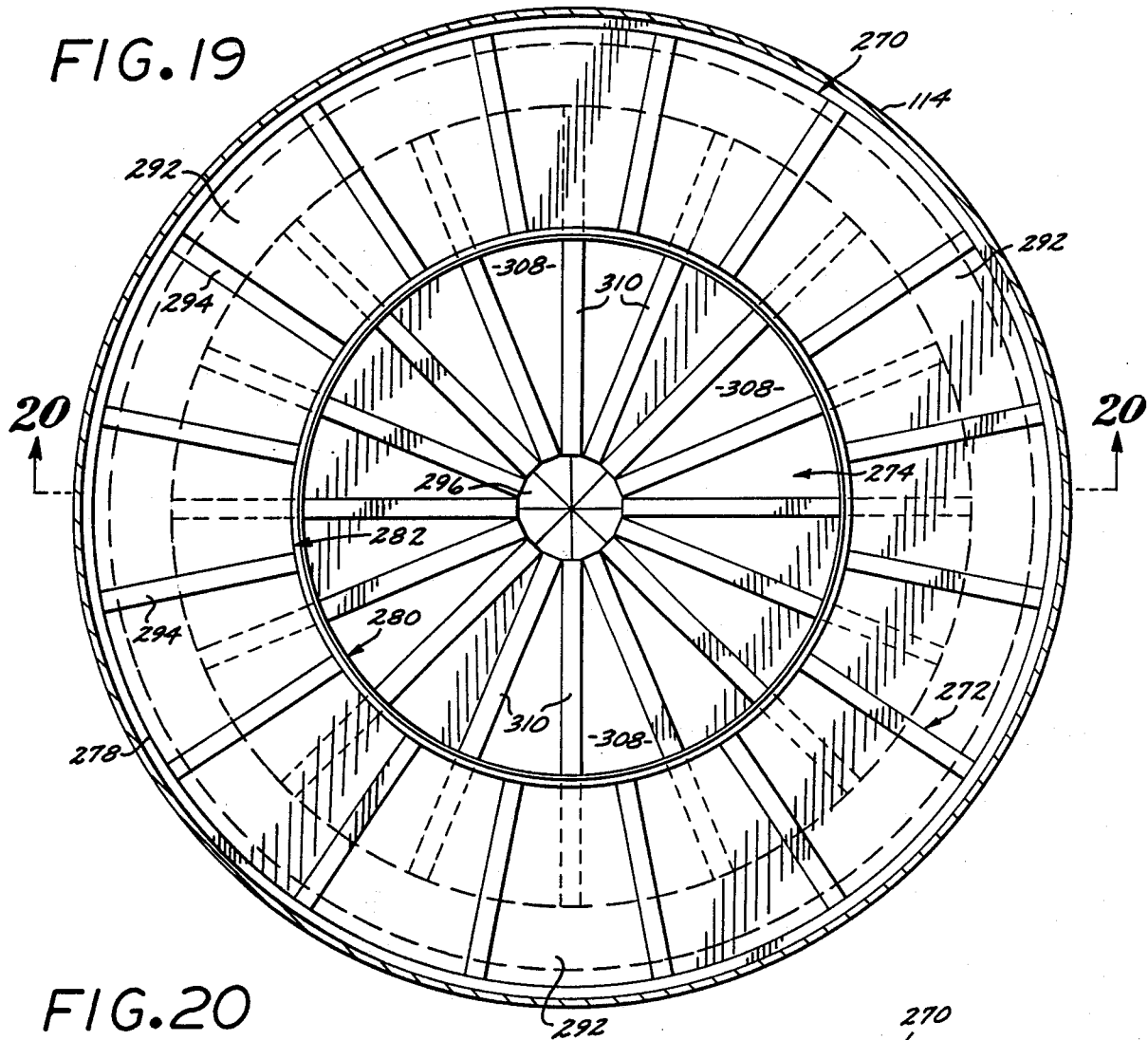
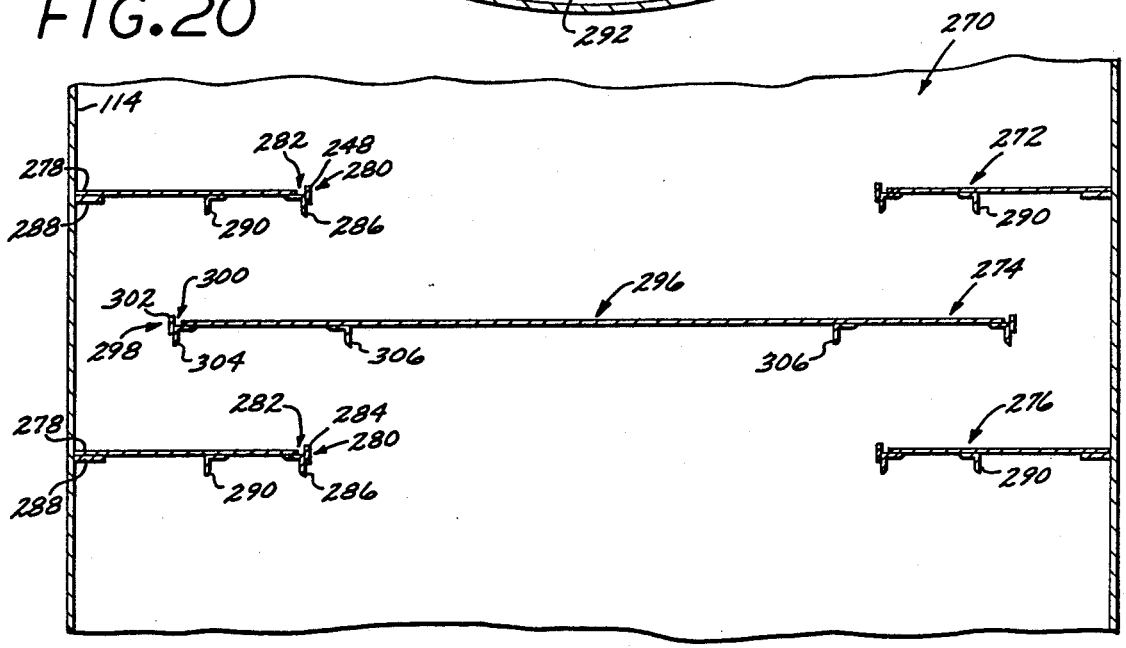

GEOTHERMAL POWER PLANT STEAM ENTRAINMENTS REMOVAL SYSTEM AND METHOD

BACKGROUND OF THE INVENTION

1. Field of the Invention

The present invention is in the field of electrical power production from steam flashed from high temperature geothermal brines which have high dissolved chloride and silica content.

2. Description of the Prior Art

Some high temperature geothermal brine resources are known which contain very large amounts of geothermal energy, but which until fairly recently had not been usable for the commercial production of electrical power because of a high dissolved silica content, and which also have a very large chloride salt content. Thus, in the Imperial Valley of California, the Salton Sea Known Geothermal Resources Area (KGRA), otherwise known as the Salton Sea Geothermal Anomaly, is estimated to have approximately 3,400 MW$_e$ of geothermal energy available for the generating of electrical power, which is believed to be self-regenerating by percolating waters. The KGRA geothermal resource is estimated to be a greater energy reserve even than the oil reserves on the North Slope of Alaska. A similar geothermal resource is the Brawley geothermal field which is also in the Imperial Valley of California. Development of these large geothermal resources was almost completely blocked until relatively recently by the high dissolved silica content, which precipitated out in vessels and piping in power production plants to the extent of up to about 42 inches per year of scaling. This problem was resolved by Magma Power Company, now of Rancho Bernardo, San Diego County, California, by flashing the geothermal brine to steam for generating electrical power in a series of first high pressure and then low pressure flash crystallizers in which the dissolved silica was precipitated out on a vast silica seed particle area rather than on surfaces of flash vessels and associated piping and valves. The use of flash crystallizers for this purpose was first taught in the Featherstone U.S. Pat. No. 4,429,535, while retrieval in reactor clarifiers of the silica seed particles useful for the purpose was taught in the VanNote U.S. Pat. Nos. 4,302,328 and 4,304,666. Applicant's U.S. Pat. No. 4,665,705 teaches an improvement over the Featherstone patent disclosure in which the flash crystallizers are made more effective by the use of external draft tubes which produce brine recirculation motive power for multifold recirculation of the geothermal brine through the flash crystallizers to provide time for silica precipitation on the silca seed particles.

Despite the foregoing solution to the silica precipitation problem, there nevertheless remained serious problems of turbine fouling and deterioration, and demister plugging and corroding in the flash crystallizers, with resulting high losses in power production revenue and high capital replacement costs in geothermal electrical power production plants located in high temperature geothermal brine regions such as the Salton Sea Geothermal Anomaly, because of entrained chlorides, silica particulates, metallic sulfide particulates and the like in the superheated steam separated from the hot geothermal brine in the flash crystallizers. Applicant has determined that steam which is separated in flash crystallizers from geothermal brine in the Salton Sea Geothermal Anomaly region contains on the order of about 500–1,000 parts per million of chlorides, together with a substantial amount of solid particulates including silica and metallic sulfide particles. These entrained materials carried with the separated steam are in the form of chloride-laden brine droplets or foam flecks which carry the solid particulate materials with them. In addition to these undesirable substances carried with the separated steam, the high velocity upward flow of separated steam in the flash crystallizers tends to cause some liquid brine to swell and crawl up the walls of the flash crystallizers from the bodies of liquid brine in the lower portions of the flash crystallizers.

Components of the dissolved solids content of the hot geothermal brine include the three primary chloride salts, sodium chloride, calcium chloride, and potassium chloride, a large dissolved silca content, and metallic sulfides. A large amount of the silica content precipitates out on the silica seed particles provided from the reactor clarifier or clarifiers as heat is extracted from the brine by the flashing of steam in the flash crystallizers, and some of the chlorides and metallic sulfides precipitate with evaporation of superheated steam from the brine in the flash crystallizers. Prior to the present invention, some of these materials have inevitably become entrained in the upwardly flowing flashed steam in the flash crystallizers and partially separated out from the steam by demisters located in the upper portions of the flash crystallizers, but also partially delivered to the steam-driven turbine or turbines. This has resulted in severe problems with both the demisters and turbines.

A geothermal power plant at the Salton Sea geothermal field having a net electrical power output on the order of from about 30 to about 50 megawatts will normally have two parallel hot geothermal brine flow systems, each of which includes a tandem sequence of a high pressure flash crystallizer and a low pressure flash crystallizer for separating steam from the geothermal brine flow streams for delivery to respective high and low pressure steam turbine stages. Each of these four flash crystallizers is normally provided in its upper portion with a demister device for the purpose of removing entrained brine droplets and particulates contained therein from the separated steam before the steam passes to the turbine, in order to protect the turbine or turbines. Prior to the present invention, such demisters have proven to be incapable of removing a sufficient amount of the brine and contained particulates entrained in the flowing steam to adequately protect the turbine or turbines, yet the quantity of entrained brine and particulates has been so large as to rapidly foul and scale the demisters, back-pressuring the flash crystallizers and seriously reducing the power generating capacity of the plant.

Prior to the present invention, such fouling of the flash crystallizer demisters has been so severe as to require that the demisters be replaced approximately every two to three weeks, with substantial plant downtime which was usually several days. In addition to the capital cost of replacing the demisters, such down-time resulted in a large revenue loss, as for example on the order of about $75,000 per day for a net 40,000 megawatt plant.

Even with the demisters, prior to the present invention a sufficient amount of brine droplets and particulates flowed with the separated steam to the turbine or turbines to cause damage to the turbines, particularly to high pressure turbine stages. Such damage included deterioration of the turbine blades, and also some shroud cracking and breaking on the turbine rotor assemblies. This, of course, involved substantial additional capital replacement costs and revenue loss from down-time.

SUMMARY OF THE INVENTION

In view of these and other problems in the art, it is a general object of the present invention to provide, in a geothermal electric power generating plant of the type employing flash crystallizer vessels for flashing hot geothermal brine to turbine motive steam, apparatus and method for barring brine droplets and particulate materials entrained in the flashed steam from reaching flash crystallizer demisters and turbine stages.

Another general object of the invention is to protect geothermal power plant flash crystallizer demisters from being fouled by brine droplets and solid particulates entrained in steam that is separated from hot geothermal brine in the flash crystallizers.

Another general object of the invention is to protect geothermal power plant steam turbine components from being fouled and damaged by brine droplets and solid particulates entrained in the steam that is separated from hot geothermal brine in the flash crystallizers.

Another object of the invention is to reduce geothermal power plant down-time and consequent large losses of revenue from the sale of electrical power.

Another object of the invention is, in a geothermal electrical power generating plant, to reduce on-going capital costs of turbine component repair and/or replacement, and of flash crystallizer demister replacement.

Another object of the invention is to provide, in a geothermal electrical power generating plant, apparatus and method for blocking geothermal brine from crawling upwardly along flash crystallizer walls and ultimately being picked up by the upwelling flashed steam and carried to flash crystallizer demisters and steam turbine stages.

A further object of the invention is to provide, in a geothermal plant flash crystallizer, a novel baffle tray system for causing the upwelling flashed steam to undergo a series of substantial centripetal accelerations for centrifugal ejection from the flashed steam of entrained brine droplets and particulates.

A further object of the invention is to provide, in a geothermal power plant flash crystallizer, a novel baffle tray system consisting of at least three staggered baffle trays for producing such centripetal accelerations of the flashed steam.

A further object of the invention is to provide such a baffle tray system in which each baffle tray is generally disk-shaped with a segmental, chordal cutout to provide a steam flow aperture.

A further object of the invention is to provide such a flash crystallizer baffle tray system in which the baffle trays are circular, consisting of a pair of annular ring trays connected to the flash crystallizer wall, and an intermediate disk-shaped baffle tray having its periphery spaced radially inwardly from the flash crystallizer wall.

A further object of the invention is to provide such a baffle tray system in which upper and lower baffle trays each consist of an opposing pair of chordal disk segments, and an intermediate baffle tray is generally diametrical with a double segmental chordal cut.

A still further object of the invention is to provide a flash crystallizer baffle tray system in combination with a demister wash water system, wash water from the demister raining down onto the baffle tray system and assisting the flushing of centrifugally separated brine droplets and particulates from the baffle tray system back down into the main body of geothermal brine in the lower portion of the flash crystallizer.

A still further object of the invention is to provide a flash crystallizer baffle tray system of the character described in combination with double tangential entry of hot geothermal brine into the flash crystallizer, the double tangential entry minimizing the quantity of brine droplets and particulates that flow upwardly with flashed steam and thereby cooperating with the baffle tray system in eliminating substantially all of the entrained brine and particulates from the steam that passes upwardly from the baffle tray system and through the demister to steam turbine stages.

Yet a further object of the invention is to provide a flash crystallizer baffle tray system of the character described which is applicable preferably to external draft tube-type flash crystallizers, but also to internal draft tube-type flash crystallizers.

A further object of the invention is to provide a flash crystallizer baffle tray system of the character described in which weirs are provided on the free edges of the baffle trays so as to retain a sheet of water on the upper surfaces of the baffle trays which spills over the weirs in sheet-like curtains of water that carry collected entrained brine and particulates back down to the body of hot brine in a lower portion of the flash crystallizer.

A further object of the invention is to provide a flash crystallizer baffle tray system of the character described in which a series of parallel ribs is provided on the upper surfaces of the baffle trays directed orthogonally to the free edges of the baffle trays to assure continuity of the sheets of water on the upper surfaces of the baffle trays despite possible warping or bowing of one or more of the baffle trays.

The preferred baffle tray system of the invention embodies three horizontal plate-like trays, each in the form of a disk having a single segmental cutout so as to leave the main body of the disk with a chordal free edge portion. These disks are horizontally mounted in the upper portion of the flash crystallizer in vertically spaced relationship with their peripheries supported on and sealed to the wall of the flash crystallizer. The upper and lower baffle trays are similarly rotationally oriented within the flash crystallizer, with their free edge portions in overlying parallel relationship, while the intermediate baffle tray is rotationally oriented 180° relative to the orientations of the upper and lower baffle trays. In the preferred form of the invention a demister and wash water system is provided above the baffle tray system, and wash water rains down on the baffle tray system. A weir at the free edge of each baffle tray causes this wash water to collect in a shallow, sheet-like pond on the upper baffle tray and part of the intermediate baffle tray, and this wash water spills over the upper baffle tray weir in a sheet-like curtain or waterfall which flows onto the upper surface of the intermediate baffle tray where it joins the wash water that was directly collected on the intermediate baffle tray, and this water then spills over the intermediate baffle tray weir as a sheet-like curtain of water and flows down onto the lower baffle tray, where it collects and spills over the lower baffle tray weir, also as a sheet-like curtain of water, and flows on down into the main body of geothermal brine in the lower portion of the flash crystallizer.

The baffle tray disks each block off the majority of the cross-section of the flash crystallizer tank, preferably blocking off between about 65 percent and about 75 percent of the cross-sectional area, and most preferably about 70 percent of the cross-sectional area, thus leaving segmental apertures between the free edges of the baffle trays and the wall of the flash crystallizer that are each preferably from about 35 percent to about 25 percent of the cross-sectional area of the flash crystallizer tank, and most preferably about 30 percent. The baffle trays are spaced so as to accelerate the rate of flow of upwelling steam separated from the brine in the flash crystallizer to about two to four times the upward rate of flow of the separated steam in the flash crystallizer tank below the baffle tray system.

With this baffle tray arrangement, the upwelling steam is first deflected by the underside of the lower baffle tray, then passes upwardly through the segmental cut of the lower baffle tray and horizontally between the upper surface of the lower baffle tray and the lower surface of the intermediate baffle tray, thence upwardly through the segmental cut of the intermediate baffle tray and thence horizontally between the upper surface of the intermediate baffle tray and the lower surface of the upper baffle tray, and finally upwardly out of the baffle tray system through the segmental cut of the upper baffle tray. This sinuous path produces a series of strong centripetal accelerations of the steam flowing through the baffle tray system, causing brine droplets and particulates entrained in the separated steam to be centrifugally ejected from the flowing steam on wall portions of the flash crystallizer tank and lower surface portions of the baffle trays, from which it is flowed by the impetus of the rapidly flowing steam to join the down-flowing wash water at the curtains of water that have spilled over the baffle tray free edge weirs, the entrained materials thus flowing downwardly with the curtains of water and along the upper surfaces of the intermediate and lower baffle trays, finally washing back down into the body of hot geothermal brine in the bottom of the flash crystallizer, and ultimately flowing with he brine from the outlet of the flash crystallizer. In this wy, substantially all of the entrained liquid and solid materials are removed from the separated steam, so that when the steam is passed through the demister to the turbine it is clean steam which will not foul either the demister or the turbine, and will not cause damage to turbine components.

By spacing the adjacent baffle trays apart from each other such as to increase the velocity of the steam at least about twice what it is below the baffle tray system, sufficient accelerations are produced in the sinuous path of the steam to eject substantially all of the entrainments from the steam. By not increasing the velocity of the steam more than about four times the velocity below the baffle tray system, the velocity through the baffle tray system is not sufficient to shear the entrapped entrainments back into the flow of steam, or break apart the down-flowing sheets or curtains of water.

According to a first alternative embodiment of the invention, each of the upper and lower baffle trays is a generally flat annular ring having its outer periphery attached and sealed to the wall of the flash crystallizer tank, and having a circular inner periphery defining a steam passage aperture and upon which the weir is circularly arranged. The intermediate baffle tray is disk-shaped, with its outer periphery spaced inwardly from the wall of the flash crystallizer tank and defining in conjunction with the tank wall an annular steam passage, with the weir being a circular weir on the periphery of the disk.

According to a third form of the invention, each of the upper and lower baffle trays comprises a pair of opposing chordal disk segments defining a diametrical slot through which the steam passes, and having straight, parallel free edges upon which weirs are provided. The intermediate baffle tray in this third form of the invention is a disk having diametrically opposite chordal cutouts through which the steam passes, each having a weir thereon.

The second and third forms of the invention function in the same manner as the presently preferred form to eject entrained material from the upwelling steam, and then flow the entrapped collected materials back downwardly in sheet-like screens of water to the body of hot geothermal brine in the lower portion of the flash crystallizer.

All three forms of the invention provide a complete 360° seal around the wall of the flash crystallizer tank. Because of this, all of the wash water which rains down onto each form of the invention is caught and utilized in the baffle tray system, and brine which may swell and crawl up the wall of the flash crystallizer from the body of brine in its lower portion is completely blocked by the baffle tray system and returned to the lower portion of the flash crystallizer tank with the down-flow of water.

BRIEF DESCRIPTION OF THE DRAWINGS

These and other objects of the invention will become more apparent in view of the following description and the accompanying drawings, wherein:

FIG. 4 is a fragmentary sectional view similar to FIG. 2, illustrating the external draft tube and brine entry nozzle into the high pressure flash crystallizer, as well as the brine recirculation circuit energized by and including the external draft tube;

FIG. 5 is an enlarged fragmentary horizontal section taken on the line 5—5 in FIG. 4, illustrating the double tangential entry box;

FIG. 6 is a fragmentary vertical section taken on the line 6—6 in FIG. 5;

FIG. 19 is a horizontal sectional view illustrating the circular form of the invention;

FIG. 20 is a fragmentary vertical, diametrical section taken on the line 20—20 in FIG. 19;

DETAILED DESCRIPTION

Figure 1:
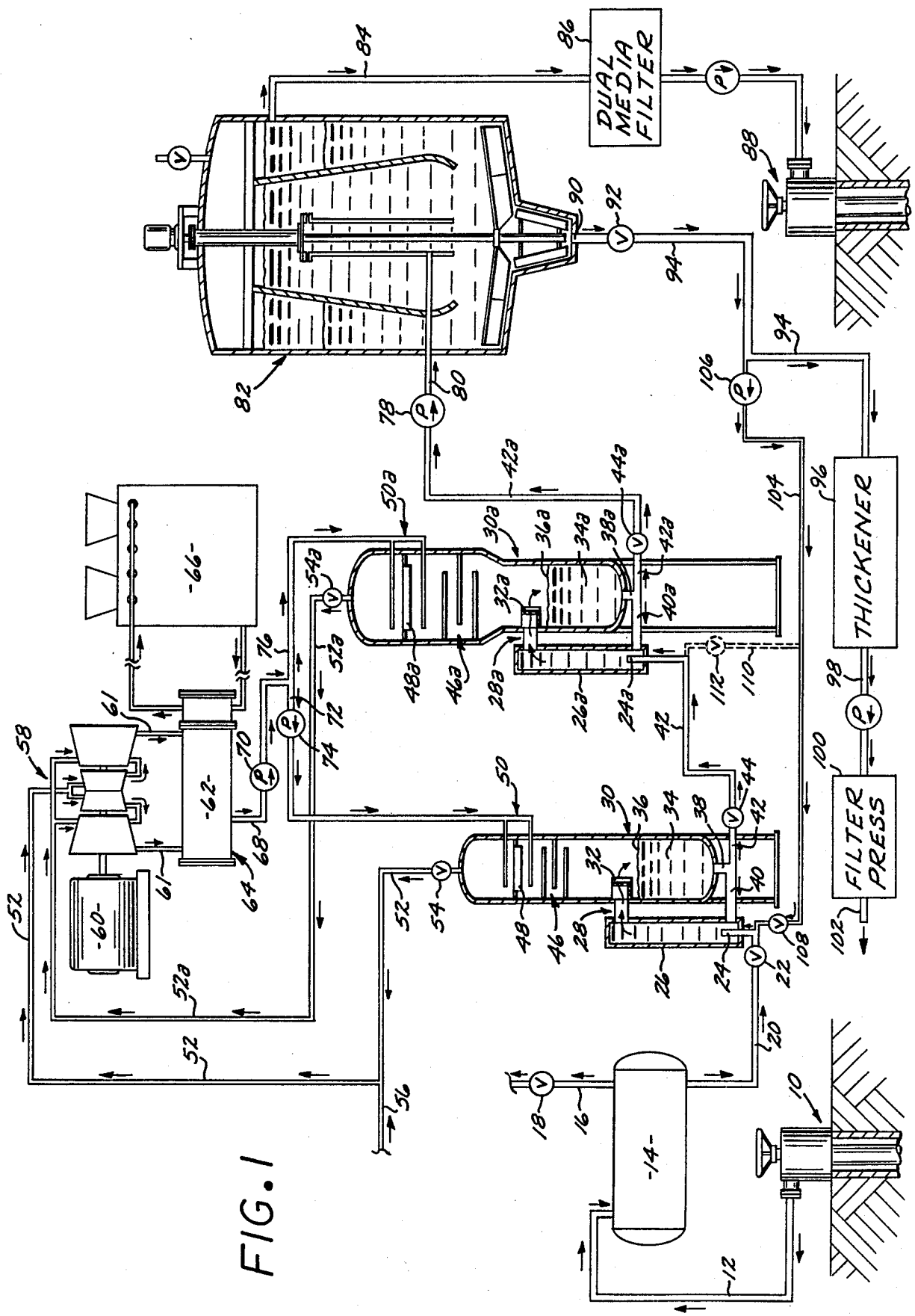
FIG. 1 is a diagrammatic view illustrating a geothermal electrical power generating plant embodying the present invention.

Referring to the drawings, FIG. 1 diagrammatically illustrates a geothermal electric power generating plant similar to the geothermal power plant shown and described in applicant's copending U.S. patent application Ser. No. 217,162, filed July 11, 1988, but with the present invention embodied in the plant. In the geothermal power plant shown and described in said copending application, high temperature geothermal brine from one or more production wells is first applied to one or more vapor separators which separate some high temperature, high pressure steam from the brine, while at the same time separating most of the noncondensable gases from the brine. Such separated steam and noncondensable gases are processed to substantially eliminate the noncondensable gases, while at the same time recovering most of the heat energy from the steam necessarily separated from the brine with the noncondensable gases, and at the same time recovering heat energy from the noncondensable gases themselves. In the system of said copending application, the remaining hot geothermal brine after such separation is then passed to one or more high pressure flash cryztallizers in which high pressure, high temperature steam is separated from the hot brine, the brine then flowing at reduced temperature to one or more respective low pressure flash crystallizers in which the remaining usable steam is separated. The steam separated in the flash crystallizers, together with steam produced from heat recovered during the noncondensable gas separation process, is directed to high and low pressure stages of one or more steam turbines which drive one or more electric power generators. The spent brine from the low pressure flash crystallizer(s) passes to one or more reactor clarifiers which remove a large quantity of particulate precipitated silica. The spent brine from the reactor clarifier(s) is then pumped back into the aquifer through one or more injection wells.

A large quantity of dissolved silica is precipitated out of the brine with the extraction of heat energy from the brine in the high and low pressure flash crystallizers, the silica being preferentially precipitated onto silica seed sludge particles derived from the reactor clarifier(s), thereby avoiding precipitation of the silica as glaze onto the walls of the flash crystallizer tanks and associated pipes and valves. The large mass of particulate silica from the flash crystallizers is flowed with the brine into the reactor clarifier(s) where further silica precipitation occurs, and the entire mass of silica sludge is collected in and removed from the reactor clarifier so that it will not clog the injection well or wells.

Such sequence of high and low pressure flash crystallizers and reactor clarifier was first disclosed in the Featherstone U.S. Pat. No. 4,429,535, which disclosed the use of internal thermosiphon draft tubes for providing recirculation of the brine in the flash crystallizers a sufficient number of times to accommodate the relatively slow silica precipitation reaction time. Applicant's prior U.S. Pat. No. 4,665,705 disclosed the use of external draft tubes for preliminary flashing of the hot brine before its entry into the flash crystallizers, and for providing the thermosiphon brine recirculation energy for recirculation of the brine through each of the high and low pressure flash crystallizers and respective associated external draft tubes. These external draft tubes enabled the hot brine to be delivered in a generally downward direction from above the brine level in the flash crystallizers so as to minimize "geysering," which is an inherent problem where internal draft tubes are used. Nevertheless, prior to the present invention, with both the external draft tube and internal draft tube-type flash crystallizers, there has been a serious problem as described in detail hereinabove in the "Prior Art" section of chloride-laden brine droplets with substantial particulate content being entrained in the upward flow of flashed steam through the flas crystallizers, such entrainments clogging and damaging demisters, and damaging expensive turbine components.

The said Featherstone U.S. Pat. No. 4,429,535 is hereby incorporated by reference for its basic method and apparatus disclosures of the sequence of flash crystallizers and reactor clarifier, and applicant's said U.S. Pat. No. 4,665,705 is hereby incorporated by reference for its method and apparatus disclosures of the flash crystallizer/external draft tube combination. Applicant's said copending application Serial No. 217,162 is hereby incorporated by reference for its method and apparatus disclosures of various geothermal power plant components which will be a part of the plant shown and described in the present application, but which are not shown or described herein because they are not directly relevant to the present invention.

Referring again to FIG. 1, one or more geothermal production wells generally designated 10 provide underground access to hot geothermal brine of the type to which the present invention is applicable, namely, hot geothermal brine which is particularly attractive as a source of heat energy for the production of electrical power because of its high temperature. The hot geothermal brine is selected to have a sufficiently high underground source temperature to enable the brine to be flowed up through the well(s) under the power of its own flashing steam, yet with the brine temperature still remaining sufficiently high at the wellhead of efficient operation of one or more electrical power generating turbines directly from steam separated from the geothermal brine. For this purpose, it is preferred that the source or bottom hole temperature of the geothermal brine be at least approximately 450° F., and the wellhead temperature be at least approximately 350° F. An example of a geothermal resource to which the present invention is particularly applicable is the Salton Sea geothermal field, sometimes referred to as the Salton Sea Geothermal Anomaly, located proximate the Niland region of the Imperial Valley in California. Another example of a geothermal resource to which the present invention appies is the Brawley geothermal field, also in the Imperial Valley. By way of example only, and not of limitation, an example well in the Salton Sea geothermal field drilled and owned my Magma Power Company based in Rancho Bernardo, California, has a bottom hole temperature of approximately 550° F. at a pressure of approximately 1250 psia (pounds per square inch absolute), with a total flow of approximately 3 million pounds per hour. Included in this flow are approximately 2,233,800 pounds per hour of water in both liquid and steam phases, approximately 757,500 pounds per hour of dissolved solids, and approximately 8,700 pounds per hour of carbon dioxide and other noncondensable gases.

Components of the dissolved solids content of the hot geothermal brine include the three primary chloride salts, sodium chloride, calcium chloride, and potassium chloride, a large dissolved silica content, and metallic sulfides. A large amount of the silica content precipitates out on the silica seed particles provided from the reactor clarifier(s) as heat is extracted from the brine by the flashing of steam in the flash crystallizers, and some of the chlorides and metallic sulfides precipitate with evaporation of superheated steam from the brine in the flash crystallizers. A substantial quantity of chloride-laden droplets and foam flecks becomes entrained in the upwardly flowing flashed steam in the flash crystallizers, and such droplets and foam flecks contain some of the aforesaid precipitated particulates. It is a primary purpose of the present invention to bar such entrained materials from both the flash crystallizer demisters and the turbine stages. Quantitatively, it is estimated that the baffle tray system of the present invention will stop on the order of about 500–1,000 parts per million of chlorides in the rising steam in the flash crystallizers and return these entrained materials to the liquid brine flowing through the flash crystallizers. Additionally, the baffle tray system of the present invention positively blocks liquid brine which tends to swell and crawl up the walls of the flash crystallizers with the upward flow of flashed steam.

Referring again to FIG. 1 of the drawings, the hot geothermal production well 10, which will be assumed by way of example to have the foregoing physical characteristics, delivers the hot brine and associated flashed steam through a supply conduit 12 to a high pressure separator 14, which is preferably a horizontal separator. Although only a single production well 10, supply conduit 12, separator 14, high and low pressure flash crystallizers and reactor clarifier are illustrated in FIG. 1, it is to be understood that any number of such components in parallel may be employed in a geothermal electric power production plant according to the invention. The flashing of steam in production well 10 not only provides the motive power for driving the hot brine up through the production well, but also provides the power for driving the brine through separator 14 and the high and low pressure flash crystallizers. High pressure separator 14 has a gas outlet conduit 16 therein which conducts separated steam and noncondensable gases through a suitable control valve 18 to a noncondensable gas removal and heat recovery system like that shown and described in detail in applicant's aforesaid copending application Serial No. 217,162.

High pressure separator 14 has a hot brine outlet conduit 20 which leads to the sequence of flash crystallizers. Thus, outlet brine conduit 20 leads through an inlet valve 22 to an injector pipe 24 in the lower end portion of vertical high pressure external draft tube 26. Inlet valve 22 controls the brine level in high pressure separator 14 by automatic control means (not shown) which operates from liquid level sensor means (not shown) in separator 14. Injector pipe 24 extends vertically upwardly through the bottom wall of external draft tube 26. Preliminary flashing of the incoming hot brine in draft tube 26 produces a two-phase flow of hot brine and steam out of the top of draft tube 26 and through an input nozzle generally designated 28 into high pressure flash crystallizer 30. Input nozzle 28 includes a double tangential entry box 32 which serves to prevent upward geysering of the two-phase flow within high pressure flash crystallizer 30. A body 34 of unflashed hot brine within flash crystallizer 30 has a surface level 36 located below input entry box 32.

The primary flashing of the hot brine to steam takes place when the brine is released through entry box 32, and by directing the incoming brine and flashing steam tangentially proximate the inner arcuate wall of flash crystallizer 30 all of the liquid brine and entrained particulate material will flow arcuately and downwardly into the body 34 of brine, and none of it will tend to move in the direction of the steam takeoff system in the upper part of flash crystallizer 30. Releasing the brine and flashing steam above the surface 36 of brine 34 produces a high flashing efficiency of the very high surface-to-mass ratio of the brine as it is released from the nozzle entry box 32, as compared to flashing below the surface level of the brine as it is necessarily done in internal draft tube-type flash crystallizers. The large amount of kinetic energy released upon the flashing into the reduced pressure vapor zone of flash crystallizer 30 is enabled, because of the low density vapor phase of the release zone, to break the brine apart into a large surface area for the flashing, as compared to the confinement of flashing in the high density body of liquid brine which is the case for internal draft tube-type flash crystallizers.

A brine exit conduit 38 extends downwardly from the bottom of flash crystallizer 30, and divides horizontally into a pair of oppositely directed conduits, a draft tube return conduit 40, and an output conduit 42 which has a control valve 44 therein. Draft tube conduit 40 communicates with the lower end portion of draft tube 26 below the top of the incoming injector pipe 24.

External draft tube 26, flash crystallizer input nozzle 28 and its entry box 32, the lower portion of flash crystallizer 30, brine exit conduit 38, and draft tube return conduit 40 constitute a recirculation loop for the hot geothermal brine in which the brine flows upwardly through draft tube 26, transversely through input nozzle 28 and its entry box 32, downwardly through the lower portion of flash crystallizer 30 and exit conduit 38, and then transversely through return conduit 40 back into draft tube 26. Flow of the hot brine through this recirculation loop is powered by translating thermal energy into circulation energy in external draft tube 26 by a thermosiphon action. A portion of the brine flashes into steam as the brine is released through injector pipe 24 into draft tube 26, thereby forming a vertically rising two-phase flow in draft tube 26. Continuous recirculation of the hot brine upwardly through draft tube 26 and then downwardly through flash crystallizer 30 is produced by the density of the brine within draft tube 26 being lower than the density of the brine in flash crystallizer 30 due to both the bubbling steam in draft tube 26 and the relatively higher temperature of the brine in draft tube 26. Such recirculation of the hot brine allows time for substantially all of the silica which comes out of the brine due to its cooling in flash crystallizer 30 to precipitate onto silca seed particles. Preferably, the brine recirculates in this circuit at least approximately six times to allow sufficient time for the relatively slow silica precipitation reaction to occur.

The steam which has flashed in draft tube 26 and primarily within flash crystallizer 30 flows upwardly in flash crystallizer 30 first through the baffle tray system of the invention, which is generally designated 46, then through a demister 48 which is sprayed by a high pressure wash water spray system 50, and then out of the top of flash crystallizer 30 through a high pressure steam output conduit 52 which has a control valve 54 therein. The high pressure steam output conduit 52 is joined by another high pressure steam conduit 56 which is provided with high pressure steam from the noncondensable gas removal and heat recovery system (not shown) like that shown and described in applicant's aforesaid copending application Ser. No. 217,162. The high pressure steam is then conducted through steam output conduit 52 to high pressure stages of a multiple stage steam turbine generally designated 58 which drives an electric power generator 60. The exhaust of steam turbine 58 passes through exhaust conduits 61 to a condensor system including a main condensor 62 which is preferably a surface-type condensor having in its bottom a condensate-receiving hotwell 64. Condensor 62 is served by conventional cooling means such as a cooling tower 66.

The condensed steam in condensor hotwell 64 is pure water known in the art as "sweet condensate" which is substantially completely devoid of dissolved salts and noncondensables from the brine, and is particularly suitable for use as wash water for the demisters in the flash crystallizers. Accordingly, a portion of this sweet condensate passes from hotwell 64 through a wash water conduit 68 having a pump 70 therein, then to a high pressure wash water branch conduit 72 having a booster pump 74 therein, and then to the high pressure wash water spray system 50 in high pressure crystallizer 30.

The fraction of the brine that does not recirculate back through external draft tube 26 flows out of high pressure flash crystallizer 30 through brine output conduit 42 and its control valve 44 to injector pipe 24a which injects this brine into the lower portion of vertical low pressure external draft tube 26a associated with the low pressure flash crystallizer. Control valve 44 controls the brine level 36 in high pressure flash crystallizer 30 by automatic control means (not shown) which operates from liquid level sensor means (not shown) in high pressure flash crystallizer 30. Preliminary flashing occurs in external draft tube 26a, and a two-phase flow of brine and steam flows upwardly through external draft tube 26a through input nozzle 28a into low pressure flash crystallizer 30a, the actual input to low pressure flash crystallizer 30a being through double tangential entry box 32a. The body 34a of brine in low pressure flash crystallizer 30a has a surface level 36a located below entry box 32a.

The brine 34a exits low pressure flash crystallizer 30a through exit conduit 38a at the bottom of flash crystallizer 30a, and part of this brine recirculates to draft tube 26a through return conduit 40a, while a fraction of this brine leaves the recirculation circuit through output conduit 42a having control valve 44a therein. As with high pressure flash crystallizer 30, the brine surface level 36a is automatically controlled by adjustment of control valve 44a pursuant to liquid level sensor means (not shown) in low pressure flash crystallizer 30a. Brine recirculation between low pressure flash crystallizer 30a and its associated draft tube 26a operates in the same manner as described in detail above for high pressure flash crystallizer 30 and its draft tube 26 to provide sufficient time for the silica precipitation reaction to occur.

The flashed steam flows upwardly in low pressure flash crystallizer 30a through the baffle tray system 46a of the invention, then through demister 48a which is provided with low pressure wash water through spray system 50a, and thence through low pressure steam output conduit 52a having control valve 54a therein. Steam output conduit 52a provides low pressure steam to low pressure stages of the steam turbine 58. Low pressure wash water is provided to the wash water spray system 50a through a branch conduit 76 from wash water conduit 68.

The multiple flash stages provided by the two flash crystallizers 30 and 30a, and the associated multiple-stage turbine 58, are thermodynamically more efficient in the generating of electrical power than a single-stage system would be. An alternative arrangement within the scope of the invention which is also thermodynamically efficient is to utilize the high pressure steam from flash crystallizer 30 to directly drive high pressure steam turbine means as shown, but to transfer heat from the low pressure steam derived from flash crystallizer 22a in heat exchanger means to a power or working fluid in a binary power system. Although the multiple flash crystallizer stages are preferred, it is to be understood that a single flash crystallizer stage may be employed within the scope of the invention.

Each of the flash crystallizers 30 and 30a is provided with sufficient liquid brine capacity relative to the sizes of its respective input and outlet conduits as adjusted by the respective output valves 44 and 44a, to enable achievement of a recirculation-to-feed rate of at least approximately 6:1. This gives the liquid brine a residency time within each of the flash crystallizers 30 and 30a that is sufficient for the supersaturated condition of the silica solution to be brought down to a level that is approximately at saturation by precipitation of the silica on the seed particles. Recycling of a small percentage of the silica sludge separated at the tail end of the plant into high pressure flash crystallizer 30 as described hereinbelow to provide seed particles of silica cumulatively presenting large surface areas of silica suspended within the brine onto which precipitating silica will preferentially amorphously form causes most of the silica which precipitates out in high pressure flash crystallizer 30 to do so in suspended, particulate form so as to flow with the brine both in the recirculation path and downstream, so that very little, if any, silica scale will form on the walls of flash crystallizer 30 and its recirculation path.

Because of the reduced solubility of silica in the lower temperature range of low pressure flash crystallizer 30a, much more silica will precipitate out of the geothermal brine in flash crystallizer 30a than in flash crystallizer 30. However, the seed particles which flow downstream from high pressure flash crystallizer 30 into low pressure flash crystallizer 30a operate in the same manner as in high pressure flash crystallizer 30 to seed the large amount of precipitating silica on to the silica sludge particles which had already grown considerably from precipitation in high pressure flash crystallizer 30, so that most of the large quantity of silica that precipitates out in low pressure flash crystallizer 30a will, like that of high pressure flash crystallizer 30, be in suspended, particulate form that will flow with the brine stream.

The spent brine from which all of the useful steam has been flashed exits low pressure flash crystallizer 30a through outlet conduit 42a and its control valve 44a, with the flow of this spent brine being maintained by a pump 78 in line 42a. The spent brine then flows through an input conduit 80 into a reactor clarifier generally designated 82 wherein the brine is allowed to flash to approximately atmospheric pressure, which will then lower the temperature of the brine to approximately the boiling point, which for the heavily salt-laden brine of the present example is approximately 225° F.

Reactor clarifier 82 serves three distinct purposes in connection with flash crystallizers 30 and 30a. First, it causes further silica precipitation in suspended, particulate form in the brine so as to lower the dissolved silica content from supersaturated to approximately saturated for the temperature of the brine in reactor clarifier 82, or may even lower the silica content to slightly below saturation at that temperature. Second, reactor clarifier 82 "clarifies" the brine by removing substantially all of the precipitated, particulate silica from the primary brine flow stream, except for a very minor quantity of extremely fine silica particles that would not be in any way harmful to the reinjection well. Third, reactor clarifier 82 provides a source of silica seed particles which are recirculated to high pressure flash crystallizer 30, and then in the main flow stream from high pressure crystallizer 30 to low pressure crystallizer 30a, such seed particles providing assurance that substantially all of the silica which does precipitate in each of the two flash crystallizers and their respective external draft tubes will precipitate in suspended, particulate form rather than as hard, glaze-like scale on surfaces within the two flash crystallizers and associated conduits and valves.

The primary stream of clarified, spent brine is conducted from reactor clarifier 82 through an outlet conduit 84 to pass through a dual media filter 86 which removes any substantial amount of particulate material that may have escaped through reactor clarifier 82 prior to passage of the primary brine stream back into the underground aquifer through an injection well generally designated 88.

Silica sludge is discharged from the bottom of reactor clarifier 82 through a gravity discharge port 90 at a flow rate controlled by a valve 92 which is sufficiently slow to enable particulate silica to accumulate in the bottom of reactor clarifier 82 to a sufficient extent for the silica sludge discharge at port 90 to be thickened preferably to approximately ten percent by weight of silica in the sludge. Most of this sludge is then conducted through a primary silica sludge conduit 94 to a sludge thickener generally designated 96, which may be a centrifuge or the like, wherein the sludge is further thickened. This primary body of silica sludge is then pumped through a conduit 98 to a filter press 100 or other de-watering device, with the resulting silica solids being discharged at a port 102.

The silica sludge feedback circuit for seeding the precipitation of silica in flash crystallizers 30 and 30a includes a sludge feedback conduit 104 which connects with the primary silica sludge conduit 94 to receive a very small fraction of the approximately ten percent by weight silica sludge from conduit 94. Sludge feedback injection pressure is provided by means of a pump 106 in conduit 104. Feedback conduit 104 communicates with the high pressure crystallizer recirculation circuit through injector pipe 24, and a valve 108 in feedback conduit 104 controls the rate of flow of the seeding sludge into high pressure draft tube 26, and hence into the high pressure crystallizer recirculation path. Agitation of the brine by the preliminary flashing in draft tube 26 provides rapid dispersion of the silica seeds through the recirculating brine stream. The silica seeds in the brine flow from high pressure crystallizer 30 to low pressure crystallizer 30a are already substantially uniformly dispersed in this flowing brine.

Although such seeding for low pressure flash crystallizer 30a will normally be adequate, if it is desired to provide additional seeding for low pressure flash crystallizer 30a because of the much greater amount of silica precipitation that must be accommodated therein, then a separate silica sludge injection conduit 110 may take off from sludge feedback conduit 104 and communicate with low pressure injector pipe 24a through a suitable control valve 112.

Figure 2:
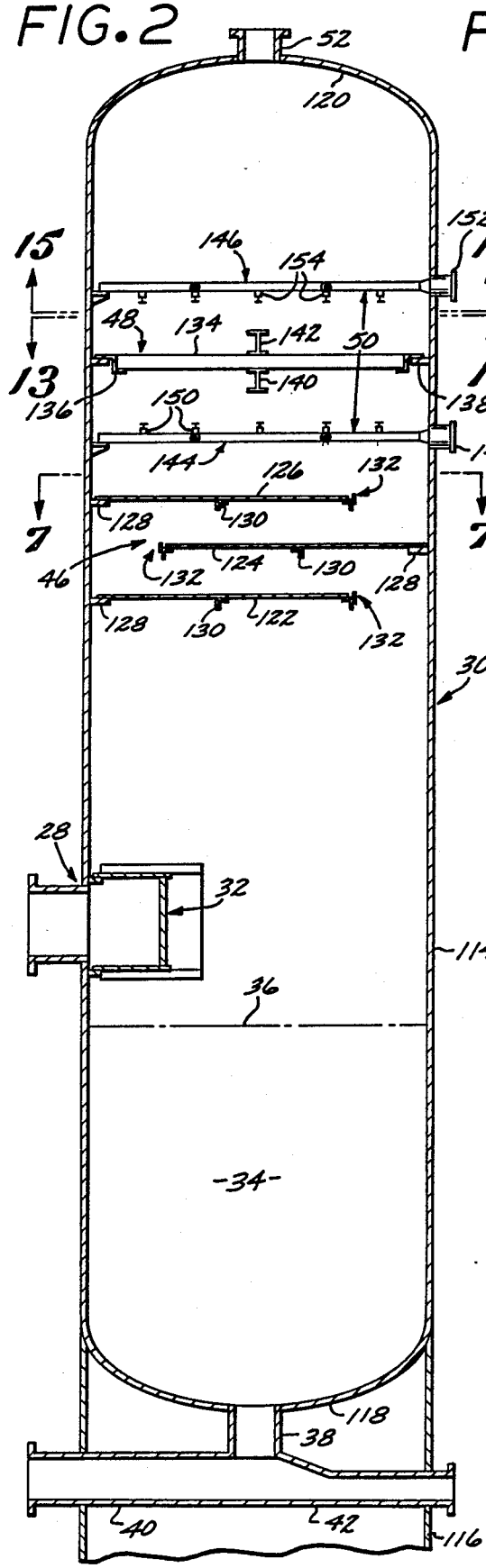
FIG. 2 is a vertical diametrical sectional view, somewhat simplified and unshaded for clarity, illustrating a high pressure flash crystallizer embodying the presently preferred form of the invention.

FIG. 2 shows some of the internal details of construction of high pressure flash crystallizer 30, and particularly details of the baffle tray system 46, demister 48, and high pressure wash water spray system 50.

High pressure flash crystallizer 30 has a generally cylindrical, vertically oriented body 114 with a cylindrical base 116. Cylindrical body 114 has an outwardly rounded bottom wall 118 and a complementary outwardly rounded top wall 120. Input nozzle 28 communicates with the inside of tank body 114 through the double tangential entry box 32 above brine surface level 36. Brine exit conduit 38 extends downwardly from tank bottom wall 118 into communication with the draft tube return conduit 40 and brine output conduit 42. Inside the upper portion of tank body 114 are seen the baffle tray system 46, demister 48 and wash water system 50. Steam output conduit 52 conducts separated high pressure steam out of tank 114 through its top wall 120.

Figure 21:
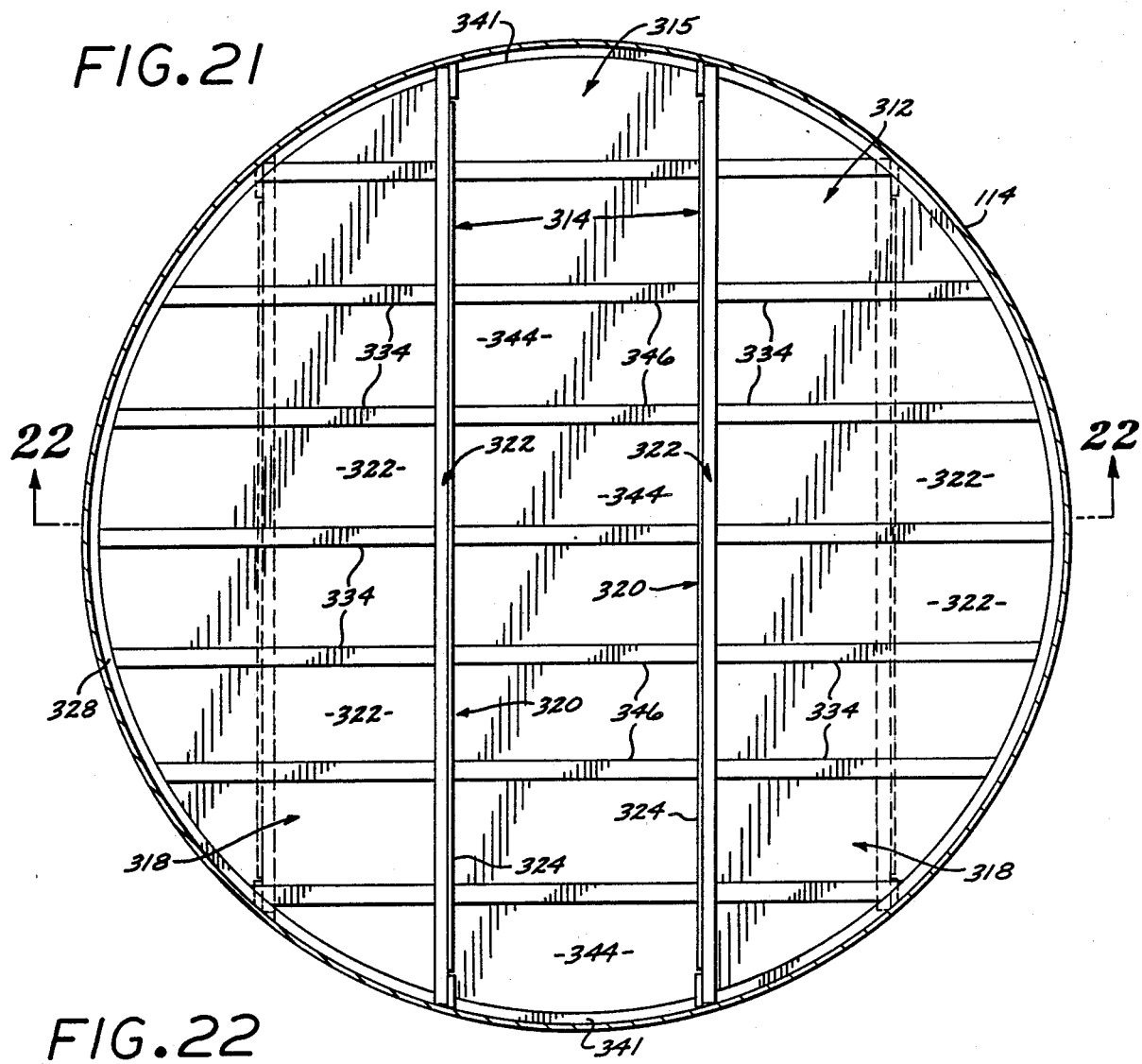
FIG. 21 is a horizontal sectional view illustrating the double segmental form of the invention.
Figure 22:
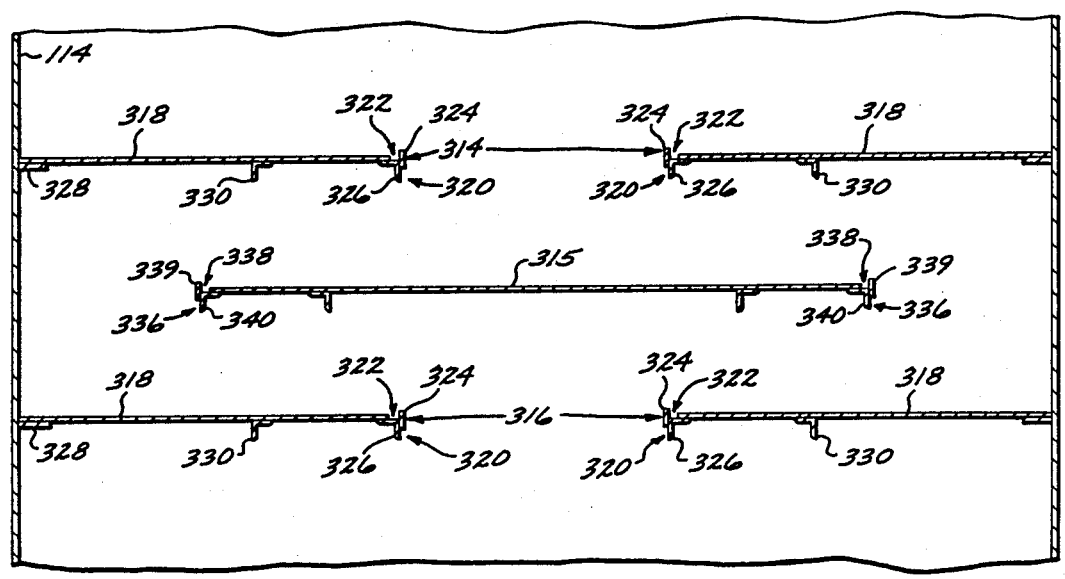
FIG. 22 is a fragmentary vertical, diametrical section taken on the line 22—22 in FIG. 21.

The baffle tray system 46 within tank body 114 consists of three horizontally oriented, vertically spaced trays or panels, a lower baffle tray 122, an intermediate baffle tray 124, and an upper baffle tray 126. The baffle tray form shown in FIG. 2 is the presently preferred form, and the details of construction and operation of baffle trays 122, 124 and 126 are illustrated in FIGS. 7-12, and will be described in detail hereinbelow in connection with those figures. A first alternative baffle tray form is shown in FIGS. 19 and 20, and a second alternative baffle tray form is shown in FIGS. 21 and 22.

In the presently preferred baffle tray form, each of the baffle trays 122, 124 and 126 is a plate-like disk which completely blanks off the horizontal cross-section of tank body 114 except for a relatively narrow segmental cutout where a segment of the disk is cut off along a straight chord. Each of the baffle tray disks is supported along its periphery on a respective support ring 128 which extends radially inwardly from tank body 114 and is peripherally coextensive with the periphery of the respective baffle tray. Each of the baffle trays 122, 124 and 126 is also supported on a respective support beam 130 which is oriented parallel to the chordal cutoff of the respective baffle tray. Each of the baffle trays 122, 124 and 126 has a free chordal edge portion 132 that is shown in detail in FIGS. 7-10 and 12, and includes an up-turned flange that serves as a weir to retain a sheet of wash wate and collected brine droplets or foam flecks with entrained solid particulates; and a down-turned flange which guides overflowing water into a sheet-like waterfall. Lower baffle tray 122 and upper baffle tray 126 are identically rotationally oriented within tank body 114, with their respective support beams 130 and free edge portions 132 all parallel to each other. Intermediate baffle tray 124 is rotationally offset 180° relative to lower and upper baffle trays 122 and 126, respectively.

With this arrangement, separated steam rising through the upper portion of tank 114 must first pass upwardly through the segmental aperture between lower baffle tray 122 and the wall of tank 114, then pass horizontally (to the left as seen in FIG. 2) between lower baffle tray 122 and intermediate baffle tray 124, then upwardly through the segmental aperture between intermediate baffle tray 124 and the wall of tank 114, then horizontally (to the right as seen in FIG. 2) between intermediate baffle tray 124 and upper baffle tray 126, and then upwardly through the segmental aperture between upper baffle tray 126 and the wall of tank 114. This sinuous path applies a sequence of substantial centripetal accelerations to the flowing steam, causing substantially all of the entrained liquid and solid particles to be centrifugally ejected from the steam onto regions of the wall of tank body 114 and the undersides of intermediate and upper baffle trays 124 and 126, respectively. As will be described in detail hereinafter in connection with FIG. 12, these entrapped liquid and solid particles are caused to flow back down through the baffle tray system into the body 34 of brine in the lower portion of tank 114.

Demister 48 consists of a generally horizontal porous pad 134 set in a support tray 136 which is secured to tank wall 114 by means of a support ring 138. Demister 48 is further secured in place by means of a pair of I-beams 140 and 142 which are horizontally diametrically located in parallel relationship across the inside of tank 114, with their ends attached to the wall of tank 114. Lower I-beam 140 is secured immediately beneath demister 48, while upper I-beam 142 is secured immediately above demister 48. Details of the construction and mounting of demister 48 will be described below in connection with FIGS. 13 and 14.

High pressure wash water spray system 50 includes a lower spray nozzle distributor assembly 144 located below demister 48 and an upper spray nozzle distributor assembly 146 located above demister 48. Each of the spray nozzle distributor assemblies 144 and 146 consists of a generally horizontal network of pipes. Lower distributor assembly 144 has an input nozzle 148 outside tank 114, and sprays wash water upwardly into the demister pad 134 through a series of upwardly directed spray heads 150. Upper distributor assembly 146 has an external input nozzle 152, and a series of downwardly facing spray heads 154 which spray wash water downwardly into the demister pad 134. Details of construction of distributor assemblies 144 and 146 are substantially the same except for their inverted orientation, and will be described below in connection with FIGS. 15-18 which illustrate upper distributor assembly 146.

Figure 3:
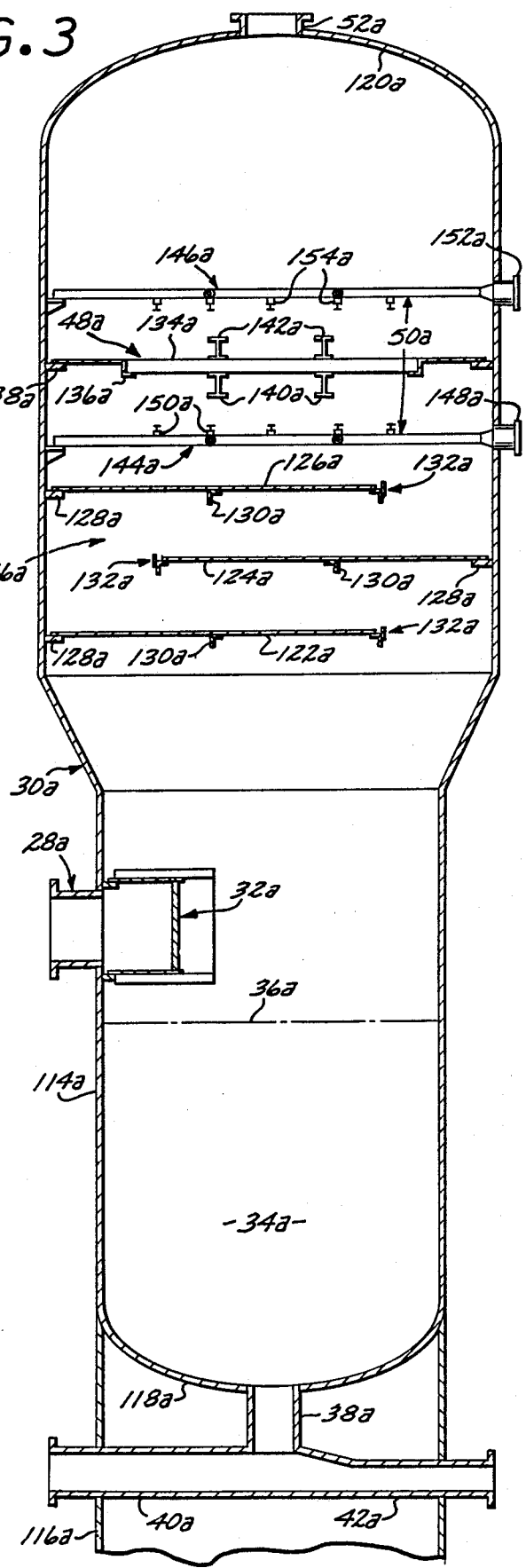
FIG. 3 is a view similar to FIG. 2 illustrating a low pressure flash crystallizer embodying the presently preferred form of the invention.

Referring to FIG. 3, low pressure flash crystallizer 30a is constructed and operates substantially the same as high pressure flash crystallizer 30, except for several differences required to accommodate a much larger volume of low pressure steam separated from the brine in low pressure flash crystallizer 30a than the volume of high pressure steam separated from the brine in high pressure flash crystallizer 30. One difference is that the generally cylindrical tank 114a of low pressure flash crystallizer 30a has lower and upper sections of differing diameters, a lower cylindrical section 156 having a diameter similar to the diameter of high pressure crystallizer tank 114, and an upper cylindrical section 158 of considerably larger diameter to accommodate the greater volume of steam. A frustoconical transition section 160 connects the lower and upper cylindrical portions 156 and 158, respectively. Another difference is that the baffle trays in low pressure flash crystallizer 30a are larger in diameter than those in high pressure flash crystallizer 30 in proportion to the increased diameter of the upper cylindrical portion 158 of low pressure flash crystallizer 30a. Also, the baffle trays of low pressure flash crystallizer 30a are vertically spaced apart further than those of high pressure flash crystallizer 30 to accommodate the increased volumetric flow of steam while producing substantially the same centripetal accelerations of the steam and consequent centrifugal ejection of liquid and solid particulate material. Other differences are two spaced-apart pairs of I-beams for demister 48a of low pressure flash crystallizer 30a, and a radially wider support tray 136a. The spray nozzle distributor assemblies 144a and 146a in low pressure crystallizer 30a are larger in diameter than the corresponding distributor assemblies in high pressure crystallizer 30 to accommodate the larger diameter of the upper cylindrical portion 158 of tank body 114a. A further difference is that steam output conduit 52a for low pressure crystallizer 30a has a larger diameter than steam output conduit 52 of high pressure crystallizer 30.

Tank body 114a has a cylindrical base 116a and outwardly convex bottom and top walls 118a and 120a, respectively. Input nozzle 28a includes double tangential entry box 32a disposed above the surface level 36a of the body 34a of liquid brine. Brine exit conduit 38a through bottom wall 118a bifurcates into draft tube return conduit 40a and output conduit 42a. Baffle tray system 46a includes lower, intermediate and upper baffle trays 122a, 124a and 126a, respectively, each of which is mounted on a support ring 128a and a transverse support beam 130a. Each of the baffle trays 122a, 124a and 126a is disk-like with a relatively small segment cut away with a straight chordal free edge portion 132a.

Demister 48a includes porous demister pad 134a located and supported in support tray 136a which in turn is supported on support ring 138a. Demister 48a is further supported on a pair of spaced, parallel, horizontal lower I-beams 140a and a pair of registering upper I-beams 142a. Low pressure wash water spray system 50a for demister 48a includes lower and upper spray nozzle distributor assemblies 144 and 146a, respectively, each consisting of a generally horizontal network of pipes, lower distributor assembly 144a having external input nozzle 148a and upwardly directed spray heads 150a, while upper distributor assembly 146a has external input nozzle 150a and downwardly directed spray heads 154a.

FIG. 4 shows the draft tube input and brine recirculation circuit of high pressure flash crystallizer 30, which is duplicated in low pressure flash crystallizer 30a. Draft tube 26 has a vertically oriented cylindrical barrel 162 serving as a vertical thermosiphon, a bottom wall 164 through which injection pipe 24 extends, and a cap 166 at its upper end. A horizontal T output from draft tube barrel 162 is spaced below cap 166, and has a flange connection 170 to an external straight tube portion 172 of input nozzle 28, tube portion 172 leading to the double tangential entry box 32 within flash crystallizer tank body 114. The recirculation path for the brine which is energized by vertical thermosiphon action in cylindrical barrel 162 also includes the bottom portion of tank body 114, brine exit conduit 38, and draft tube return conduit 40 which has a flange connection 174 to T input conduit 176 which communicates with the inside of barrel 162 near its bottom.

To assure optimum recirculation from the vertical thermosiphon energy, it is important that the upper end of ejector pipe 24 be located above recirculation input conduit 176. Also, by having cap 166 spaced above draft tube output conduit 168, nozzle packing is improved, providing more even distribution of the two-phase (liquid and steam) flow into high pressure flash crystallizer 30 through input nozzle 28.

FIGS. 5 and 6 illustrate the construction of double tangential entry box 32. It includes vertically spaced, parallel, horizontal top and bottom walls 178 and 180, respectively, which span nozzle input tube 172. Top and bottom walls 178 and 180, respectively, are arcuate about the vertical axis of cylindrical tank 114 and are attached to the wall of tank 114 by means of flat, arcuate flanges 184 at their arcuate outer edges. Arcuate inner edges 186 of top and bottom walls 178 and 180 are concentric with the outer edges and flanges 184. The structure of double tangential entry box 32 is completed by a cylindrical inner wall 188 which is concentric with tank 114 and is secured to the inner edges 186 of top and bottom walls 178 and 180, as by welding. Arcuate stiffening ribs 182 may be applied to the top of top wall 178 and the bottom of bottom wall 180.

With this construction, top wall 178, bottom wall 180 and cylindrical inner wall 188 of entry box 32, in cooperation with the cylindrical wall of tank 114, define a pair of oppositely directed tangential tunnels 190 and 192 having respective outlet openings 194 and 196 which guide the flow of entering brine and steam horizontally and tangentially along the wall of tank 114. With the brine and steam entering in this manner, above the surface level 36 of the liquid brine, the liquid brine circulates around the tank, falling into the body 34 of brine, and the separated steam, which is partially released in draft tube 26 and then primarily released as the two-phase medium flows out of the tangential openings 194 and 196, flows upwardly through tank 114.

With this type of double tangential entry, there is no possibility of any upward geysering of liquid brine with the steam, and upward flow of entrained brine droplets and particulates with the steam is minimized such that the baffle tray system 46 of the invention is capable of substantially completely eliminating such brine droplets and particulates from the flow of steam through the demister to the turbine.

Figure 7:
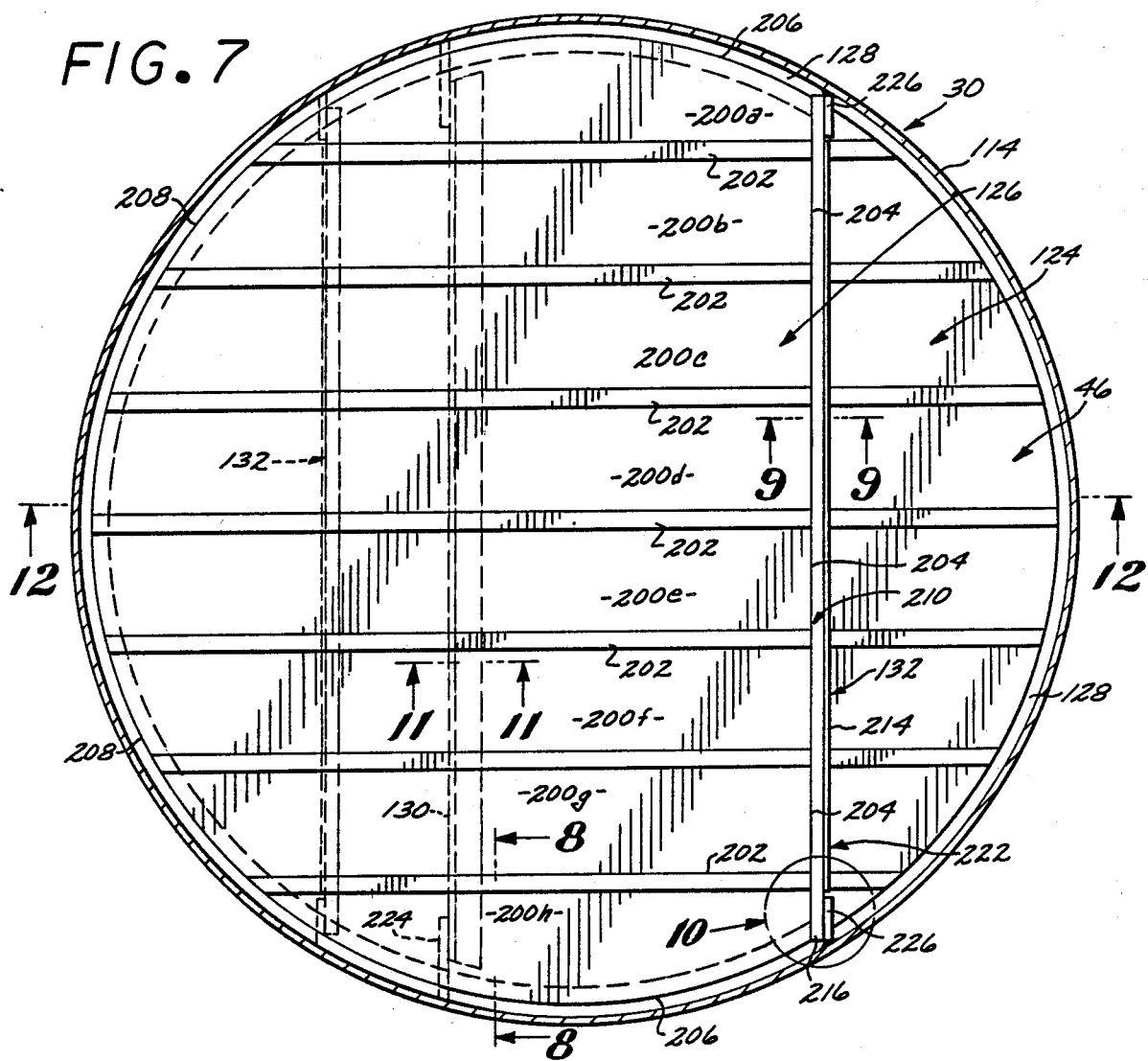
FIG. 7 is a horizontal section taken on the line 7—7 in FIG. 2 showing the upper and intermediate baffle trays.

FIG. 7 is a horizontal sectional view taken on the line 7—7 in FIG. 2 looking downwardly on the baffle tray system 46 of the invention. Thus, the entire upper baffle tray 126 is seen in top plan view, while a small segment of intermediate baffle tray 124 is also seen in top plan view. The entire lower baffle tray 122 is blanked in FIG. 7 by upper and intermediate baffle trays 126 and 124, respectively. The free edge portion 132 of upper baffle tray 126, seen in solid lines, defines the segment of intermediate baffle tray 124 visible in FIG. 7. Free edge portion 132 of intermediate baffle tray 124 is seen in dotted lines. Support rings 128 for both upper and intermediate baffle trays 126 and 124, respectively, are directly visible in FIG. 7, while the transverse support flang 130 for upper baffle tray 126 is seen in dotted lines.

FIGS. 7-11 illustrate details of construction and mounting of the presently preferred form of upper baffle tray 126, which is preferably the same for each of the lower and intermediate baffle trays 122 and 124, respectively. Baffle tray 126 is preferably constructed of a series of elongated, flat, generally straight, parallel plates. In the illustrated form, there are eight of these plates, designated 200a-h. Adjacent plates 200a-h are connected, as by welding, by elongated connecting bars 202 which are disposed on the upper surfaces of plates 200a-h which serve as shallow upwardly directed ribs that define flat, liquid-holding channels above the respective plates 200a-h. Connecting bars 202 are coextensive with the lengths of the side edges of the plates 200a-h which they connect.

An important feature of the present invention is establishment of a sheet of water which covers substantially the entire top of each of the three baffle trays, and continuous flowing of this sheet of water in the direction of the free edge portions 132 of the respective baffle trays. Because of the relatively large diameters of the baffle tray disks (e.g., approximately 13 feet for the high pressure crystallizer 30, and considerably larger for the low pressure crystallizer 30a), single-sheet construction of the baffle trays could result in warping of the sheets, with substantial areas of the sheets left uncovered by water and consequently inoperative. Again describing the construction of each of the three baffle trays specifically in connection with upper baffle tray 126, with the construction of the series of plates 200a-h connected at their edges by upwardly rising connecting bars 202, even if warping should occur, it would not interfere with the operation of the baffle trays. Considering the elongated orientations of plates 200a-h and connecting bars 202 as the longitudinal direction, and the orientation of support flange 130 and front edge portion 132 as the transverse direction, even if warping should occur the raised connecting bars 202 would minimize transverse flow of water on the top of the baffle tray and assure nevertheless that each plate 200a-h would be fully covered by a sheet of water which, as it is collected, will continuously flow longitudinally in the direction of the free edge portion 132, or to the right in FIG. 7 for upper and lower baffle trays 126 and 122, respectively, and to the left in FIG. 7 for intermediate baffle tray 124. Additionally, the increased thickness of each baffle tray where connecting bars 202 join the adjacent plates 200a-h considerably enhances the structural strength of each baffle tray in the longitudinal direction, thereby minimizing warping in the longitudinal direction.

The front edges 204 of baffle tray plates 200a-h are all aligned with each other in the transverse direction so as to define a straight-line chord. The front ends of connecting bars 202 are cut in registry with the front edges of plates 200a-d. The outer side edges 206 of the outermost two plates 200a and 200h are arcuate and overlap support ring 128. The near edges of plates 200b-g are also arcuate and overlap support ring 128.

Figure 9:
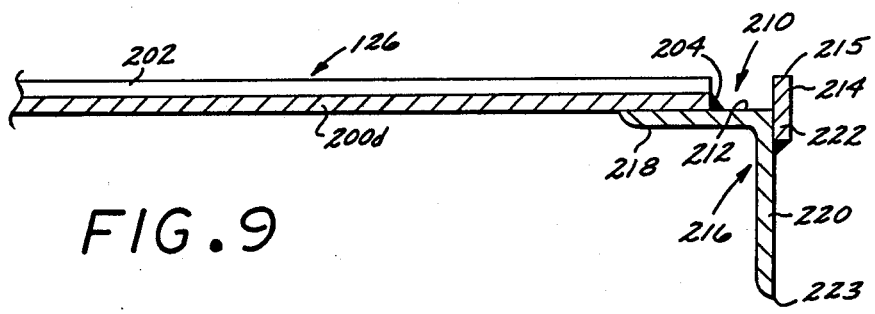
FIG. 9 is an enlarged fragmentary vertical section taken on the line 9—9 in FIG. 7.

A transverse collector channel generally designated 210 and best seen in FIG. 9 is defined forward of the front edges 204 of plates 200a-h proximate the free edge portion 132 of baffle tray 126. Collector channel 210 extends substantially the width of the free edge portion 132. Collector channel 210 has a bottom wall 212 and a forward wall 214 in the form of an up-turned flange. Upper edge 215 of forward wall 214 is preferably disposed at substantially the same level as the top surfaces of connecting bars 202, and hence substantially higher than the top designated 216 is connected, as by welding, to the undersides of plates 200a-h alongside substantially the length of the free edge portion 132. Angle member 216 has a horizontal portion 218 which defines the bottom wall of collector channel 210 and is attached to plates 200a-h, and a down-turned vertical flange portion 220. A transverse bar 222 is attached, as by welding, to the front surface of flange portion 220 and forms the forward wall 214 of transverse collector channel 210.

Transverse bar 222 serves as a weir behind which water from above plates 200a-h is collected in collector channel 210, and over which the continuously collecting water on top of baffle tray 126 and in channel 210 spills in a continuous flow along the entire length of transverse bar 222. The water overflowing this weir 222 flows down along the forward surface of weir 222 and thence along the forward surface of down-turned flange 220, and then flows downwardly from flange 220 in a continuous curtain or sheet to the upper surface of intermediate baffle tray 124. As will be described in detail in connection with FIG. 12, some brine and particulates which had been entrained in the steam will be moving outwardly along the bottom surfaces of plates 200a-h (to the right in FIG. 9) under the impetus of the flowing steam, and will flow underneath angle member 216 and down along the inner surface of flange 220, being caught up in the down-flowing curtain of water proximate the lower edge 223 of flange 220. In order to effect as smooth a merger of this separated brine and particulate material into the down-flowing curtain of water, it is preferred to taper or feather the lower edge of flange 220 downwardly and forwardly or outwardly to a relatively sharp edge 223.

Figure 10:
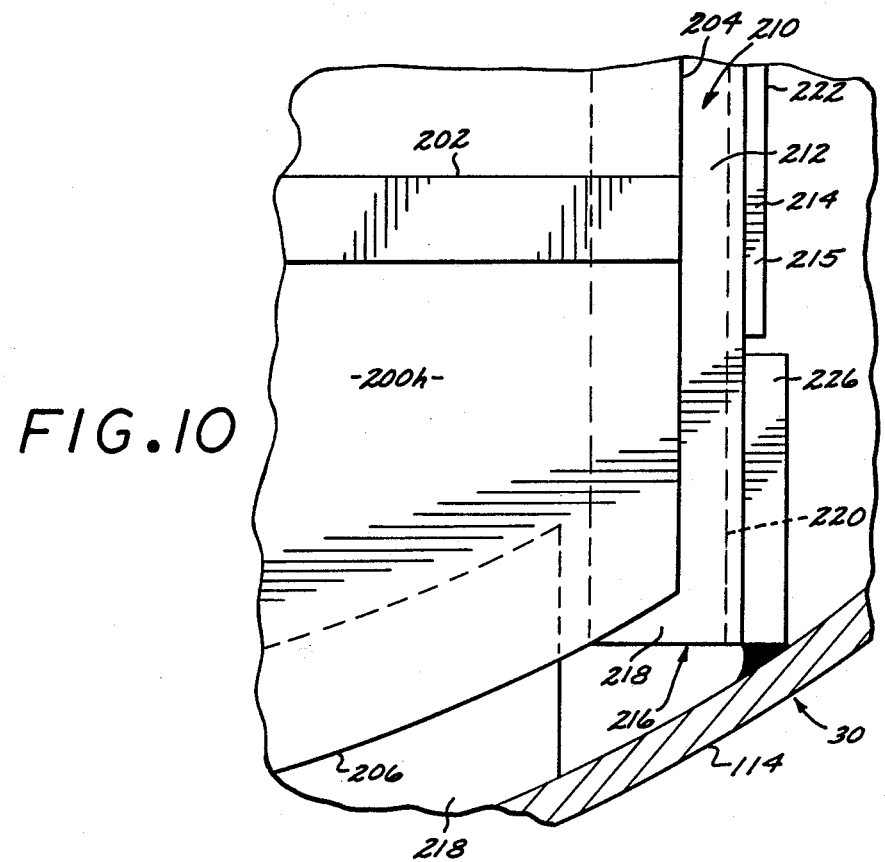
FIG. 10 is an enlarged fragmentary horizontal view of the encircled region designated 10 in FIG. 7.

FIGS. 7 and 10 illustrate supporting means for the front angle member 216, in the form of an attachment ear 226 at each end of angle member 216 which is attached to tank 114, as by welding, and to which the ends of angle member 216 are bolted. By this means, angle member 216 serves as a forward support for baffle tray 126, in addition to its functions as part of the structure defining transverse collector channel 210 and establishing the down-flowing curtain of water and cooperating in the merging of separated entrainments with the down-flowing curtain of water.

Figure 8:
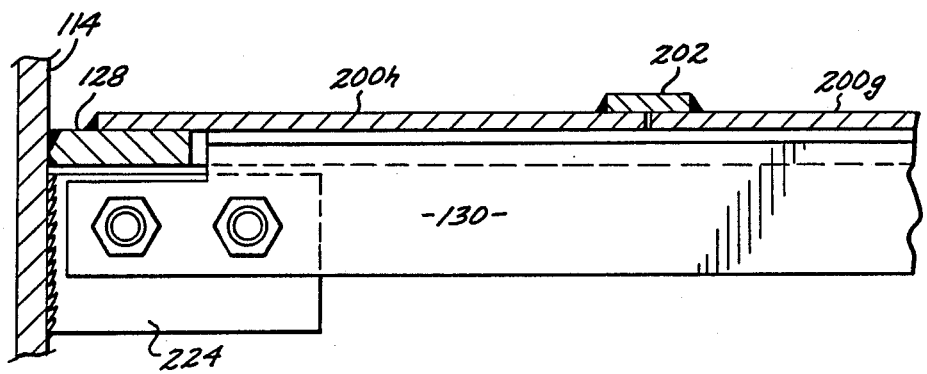
FIG. 8 is an enlarged fragmentary vertical section taken on the line 8—8 in FIG. 7.
Figure 11:
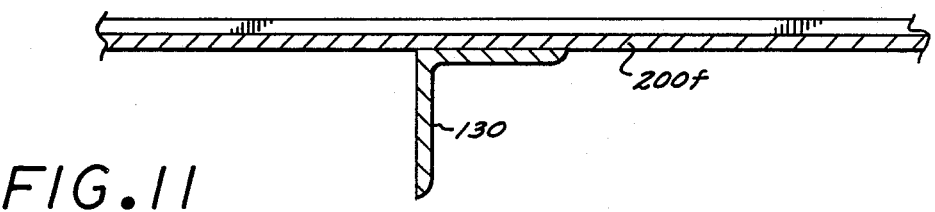
FIG. 11 is an enlarged vertical section taken on the line 11—11 in FIG. 7.

FIGS. 7 and 8 disclose a similar attachment means for the rearward support beam 130, in the form of an attachment ear 224 at each end of beam 130 which is connected to tank 114, as by welding, and to which the ends of beam 130 are bolted. As best seen in FIG. 11, support beam 130 is in the form of a down-turned angle member.

While details of construction and mounting, and some aspects of operation, of one of the baffle trays of the invention have been described hereinabove in connection with only the upper baffle tray 126, it is to be understood that each of the intermediate and lower baffle trays 124 and 122, respectively, is preferably the same in both structure and operation. Similarly, each of the three baffle trays of low pressure flash crystallizer 30a is also preferably constructed, mounted, and operates in the same manner as described in connection with high pressure crystallizer upper baffle tray 126, the only exceptions being that the three baffle trays 122a, 124a and 126a of low pressure flash crystallizer 30a have a substantially larger diameter and are vertically spaced farther apart.

Figure 12:
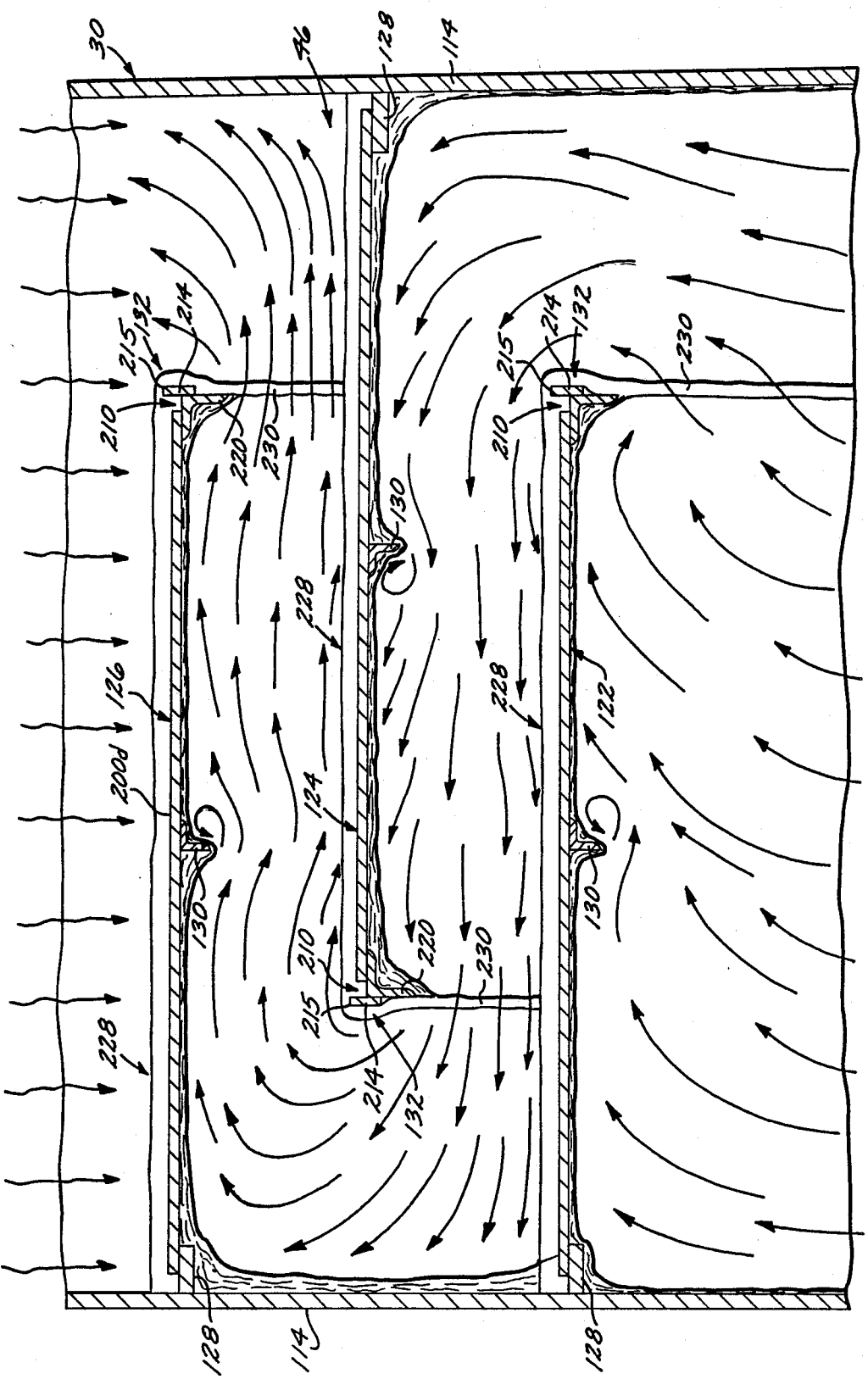
FIG. 12 is an enlarged, fragmentary horizontal section taken on the line 12—12 in FIG. 7, with downward arrows at the top indicating wash water raining down from the demister, flow arrows indicating the direction of flow of steam passing through the baffle tray system, and captured material on tank and baffle tray walls, as well as water accumulated on the tops of the baffle trays and flowing over the baffle tray weirs into sheets or curtains of down-flowing water.

FIG. 12 diagrammatically illustrates the mode of operation of the baffle tray system 46 for substantially eliminating entrained brine and particulates from the steam before it is passed out of the high pressure flash crystallizer 30 to the turbine.

Wash water from the high pressure wash water spray system 50 rains down onto the baffle tray system 46 from demister 48, and the majority of this wash water is captured as a sheet of water designated 228 on upper baffle tray 126, while some of this wash water is also captured on intermediate baffle tray 124 as part of a sheet 228 of water. As seen in FIG. 9, the upper edge 215 of the top of the weir flange 214 is located at about the same height as the tops of connecting bars 202. Because of the thickness of the sheet of water flowing over weir flange 214, the sheet or pool of water on the top of baffle tray 126 will generally cover both the plates 200a-h and the connecting bars 202. The wash water rains down from the demister in generally the same pattern that is was sprayed onto the demister, which is relatively uniform across the cross-section of tank 114. Upper baffle tray 126 and intermediate baffle tray 124 together provide a complete seal of the cross-section of tank 114 to assure that all of the wash water is caught and utilized in a operation of the baffle tray system 46. The sheet 228 of water captured on upper baffle tray 126 flows to the right as seen in FIG. 12 to the transverse collector channel 210, and then spills over the top 215 of weir 214 and cascades downwardly along the front of weir 214 and flange 220, then cascading downwardly as a free-falling curtain or sheet of water to the top of intermediate baffle tray 124, where it joins wash water that flowed directly onto intermediate baffle tray 124 from the demister in the sheet 228 of water on the top of intermediate baffle tray 124. This sheet 228 of water flows to the left on intermediate baffle tray 124 to its transverse collector 210 and spills over the top 215 of weir 214 and then down along the front of weir 214 and flange 220, becoming a second free-falling curtain or sheet 230 of water which cascades down onto the top of lower baffle tray 122, forming a third sheet 228 of water on the top of lower baffle tray 122. This sheet 228 flows to the right as viewed in FIG. 12 to collector channel 210 and spills over the top 215 of weir 214 and thence downwardly along the front of weir 214 and flange 220 and free-falls as a third curtain or sheet 230 of water down into the body 34 of brine in the bottom of tank 114.

The upward flow of separated steam and the centripetal accelerations of the steam caused by the baffle tray system are illustrated by the flow arrows in FIG. 12. As the separated steam flows upwardly in tank 114, part of it is deflected and curved to the right in FIG. 12 by the lower baffle tray 122, the curving arrows representing centripetal accelerations which will cause a relatively small fraction of the entrained brine and particulates to be centrifugally ejected onto the bottom of tray 122. Also, some brine will tend to swell and crawl up the wall of tank 114, and the majority of this will be blocked and captured on the bottom surface of baffle tray 122. All of these aforesaid materials accumulated on the bottom of baffle tray 122 will have a consistency much like that of the brine in the lower portion of tank 114, and force of the flowing steam to the right underneath baffle tray 122 will cause these materials to flow to the right in FIG. 12 to the down-turned flange 220 at the free edge portion 132 of baffle tray 122, flange 220 deflecting these materials downwardly to join the curtain 230 of down-flowing water, being returned to the body 34 of brine in the bottom of tank 114 with the curtain 230 of water. Some of the gathered materials on the bottom of lower baffle tray 122 may be deflected back down to the body 34 of brine by support beam 130.

As the up-flowing steam is confined between the free edge portion 132 of lower baffle tray 122 and the wall of tank 114 by the segmental opening, and then deflected and curved to the left in FIG. 12 to flow generally horizontally to the left between lower baffle tray 122 and intermediate baffle tray 124, there will be substantial centripetal acceleration of the steam which causes a substantial portion of the entrained brine and particulates to be centrifugally ejected out of the flow path of the steam onto the wall of tank 114 and to a larger extent onto the bottom surface of intermediate baffle tray 124. Also, the remainder of the brine which may be swelling and crawling up the wall of tank 114 that was not caught by baffle tray 122 will be caught by baffle tray 124, the two baffle trays 122 and 124 together providing a complete 360° barrier against such upward movement of brine along the tank wall. The entrained brine ejected from the steam against the tank wall proximate the segmental opening of lower baffle tray 122, and any brine crawling up the tank wall in that region, are blown by the flowing steam up onto the lower surface of intermediate baffle tray 124 and join the ejected entrained brine and particulates caught against the bottom wall of intermediate baffle tray 124, and all such captured materials will flow to the left in FIG. 12 under the impetus of the rapidly flowing steam, and will be deflected downwardly by the down-turned flange 220 at the free edge portion 132 of intermediate baffle tray 124 into the curtain 230 of water which flows over weir 214 and down onto the top of lower baffle tray 122, to be flowed in sequence off of lower baffle tray 122 into the body of brine in the lower portion of the tank. Again, some of this captured material on the bottom of intermediate baffle tray 124 may be deflected downwardly by support member 130 to fall into the sheet 228 of water on lower baffle tray 122.

The steam undergoes a complete 180° reversal when it passes from between lower and intermediate baffle trays 122 and 124, respectively, through the segmental gap in front of intermediate baffle tray 124, and thence into the space between intermediate and upper baffle trays 124 and 126, respectively. The resulting powerful centripetal acceleration will cause centrifugal ejection of substantially all of the remaining entrained brine and particulates from the steam onto the wall of tank 114 and the underside of upper baffle tray 126. The rapid flow of steam will carry all of this deposited material upwardly along the wall of tank 114 and to the right in FIG. 12 along the bottom surface of upper baffle tray 126, the material flowing into confluence with the curtain 230 of water which flows over the top of upper baffle tray weir 214 and downwardly onto the upper surface of intermediate baffle tray 124.

Deflection of the agglommerated captured materials downwardly by the down-turned edge flanges 220 to join the respective curtains 230 of water avoids the possibility of the captured materials being sheared off the edges of the baffle trays and re-entrained in the steam. Also, the down-turned edge flanges 220 provide a drip impetus to both the down-flowing curtains of water and the flow of captured entrained brine and particulates which is joining the curtains of water. The mass waterfall-like flow characteristic of each of the curtains 230 of water minimizes the chance of the water and captured materials becoming picked up and entrained in the flowing steam.

In this manner, substantially all of the brine and particulates entrained with the steam when the steam is separated from the body of brine in the lower portion of tank 114 are captured and flowed back down into the body of brine.

Even without the presence of the wash water raining down onto the baffle tray system 46, the baffle tray system will work quite well in removing entrained brine and particulates from the upwardly flowing separated steam. The centripetal accelerations of the steam described hereinabove will still cause separation of substantially all of the entrained brine and particulates from the steam onto wall portions of tank 114 and the bottom surfaces of the three baffle trays. In this case, the weir 214 may be omitted from upper baffle tray 126. The captured materials flowing outwardly along the underside of upper baffle tray 126 under the impetus the rapidly flowing steam will still be deflected downwardly by the down-turned flange 220 and form into a curtain 230 of liquid brine and particulates which will fall down onto intermediate baffle tray 124, and these will collect in a sheet 228 on the upper surface of intermediate baffle tray 124 and flow over weir 214 and downwardly in a curtain 230 of brine, being joined with the collected materials from the underside of intermediate baffle tray 124 to flow onto the upper surface of lower baffle tray 122, flowing over its weir 214 into a curtain 230 of collected brine and particulates, being joined at flange 220 of lower baffle tray 122 by the brine and particulates that have been collected on the underside of lower baffle tray 122, this curtain 230 then flowing down to the body 34 of brine in the lower portion of tank 114. Nevertheless, according to the best mode of the invention, the wash water for the demister is rained down onto the baffle tray system 46 so as to provide substantial additional downflow impetus for returning the entrained brine and particulates captured by the baffle tray system 46 down into the primary geothermal brine flow system.

The baffle tray system 46a in the low pressure flash crystallizer 30a operates in the same way as described in detail hereinabove in connection with FIG. 12 for the baffle tray system 46 of the high pressure flash crystallizer 30.

It is presently preferred that each of the baffle trays 122, 124 and 126 of high pressure crystallizer 30, and also each of the baffle trays 122a, 124a and 126a of low pressure crystallizer 30a, be constructed so as to blank off in the range of from about 65 percent to about 75 percent of the cross-sectional area of the respective tank 114 or 114a, thus leaving a segmental aperture in the range of from about 35 percent to about 25 percent of the cross-sectional area of the respective tank. The most preferred amount of cross-sectional blanking by each of the baffle trays is about 70 percent, leaving a preferred segmental aperture of about 30 percent. The minimum number of staggered baffle plates for satisfactory operation of the invention is three. Although the invention has been shown and described in connection with three baffle trays, it is to be understood that additional ones may be employed within the scope of the invention.

The vertical spacing between the baffle trays is preferably such that the steam velocity between successive pairs of baffle trays is in the range of from about two to about four times the velocity of the steam in the flash crystallizer below the baffle tray system. With a steam velocity between adjacent baffle trays below about two times the steam velocity in the lower portion of the flash crystallizer, the centripetal accelerations are not sufficient to assure substantially complete removal of the entrained brine and particulates. Above approximately four times the velocity between adjacent baffle trays as the velocity in the lower portion of the flash crystallizer, there is a possibility of the fallout being sheared back into the main flow of steam, and/or the possibility that the steam might break apart the down-flowing sheets or curtains 230 of water and entrained materials. Within the range of from about two to four, the flowing steam does not appear to pick up any of the materials that have been accelerated out of the flow and which move with the flow along the bottom sides of the three baffle trays, and the flowing steam does not appear to pick up any of the entrained brine and particulates as the steam passes through the three curtains or waterfalls 230. As a dimensional example, for a flash crystallizer approximately 13 feet in diameter in the region of the baffle tray system, satisfactory operation will be provided with the baffle trays approximately 2½ feet apart from each other.

Figure 13:
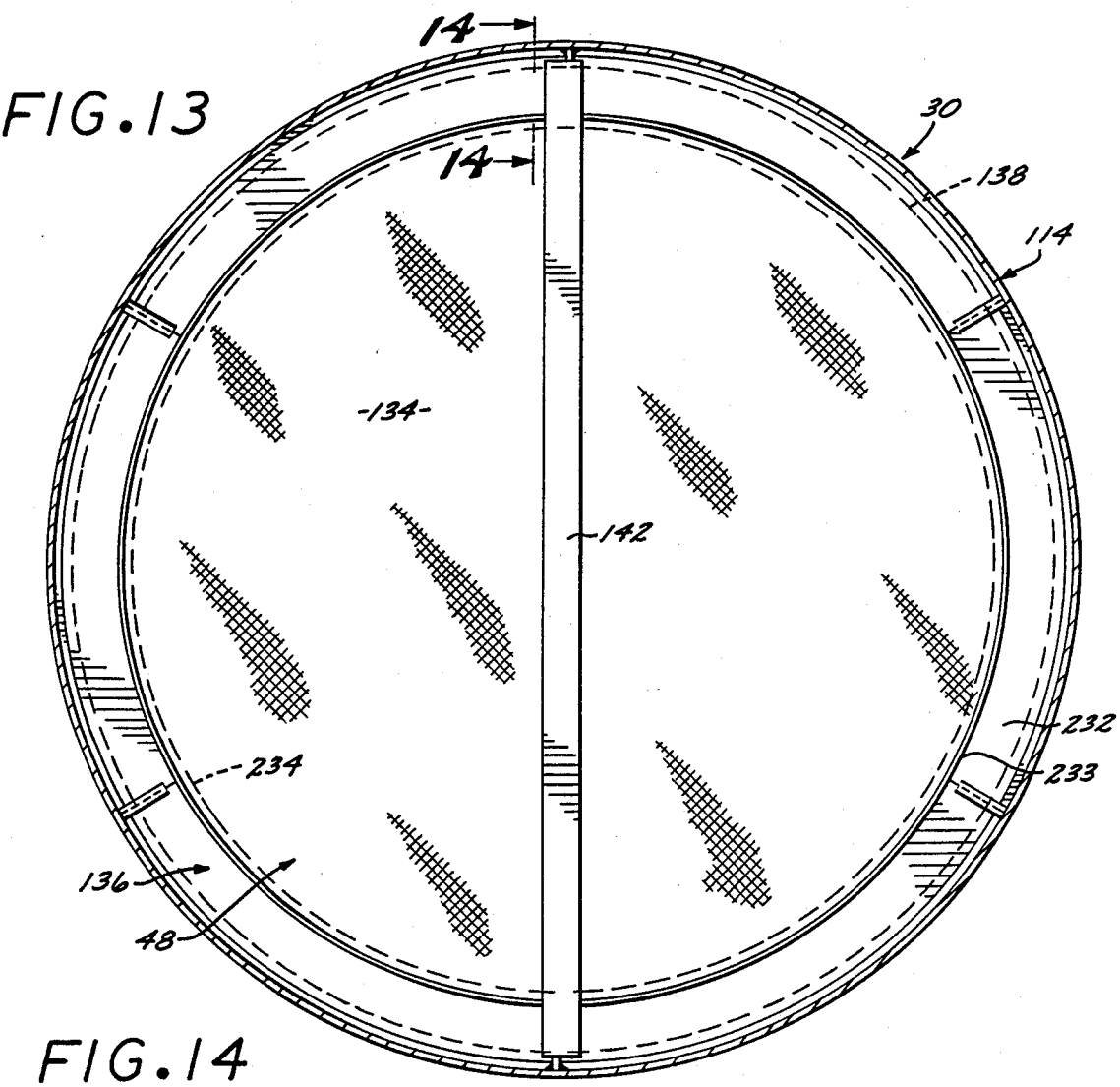
FIG. 13 is an enlarged horizontal section taken on the line 13—13 in FIG. 2 showing the demister of the high pressure flash crystallizer.
Figure 14:
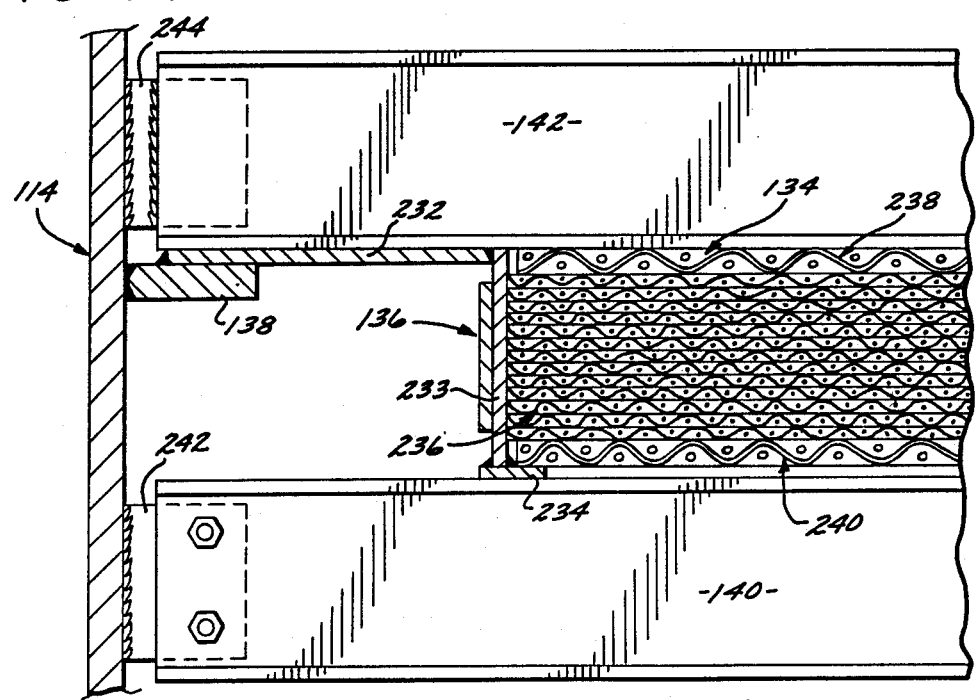
FIG. 14 is a further enlarged, fragmentary vertical section taken on the line 14—14 in FIG. 13.
Figure 15:
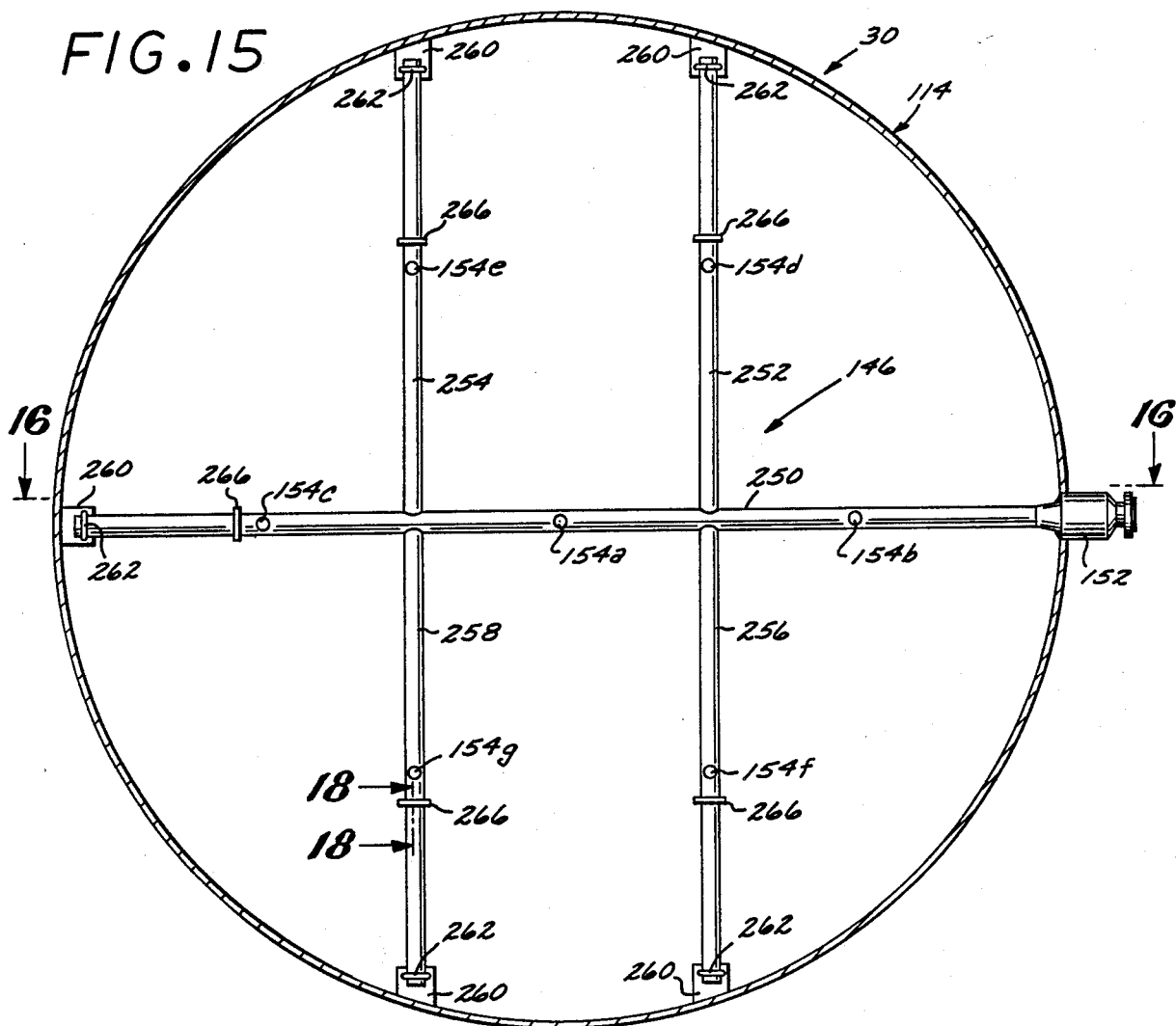
FIG. 15 is an enlarged horizontal cross-section taken on the line 15—15 in FIG. 2, illustrating a portion of the wash water system in the high pressure flash crystallizer.
Figure 16:
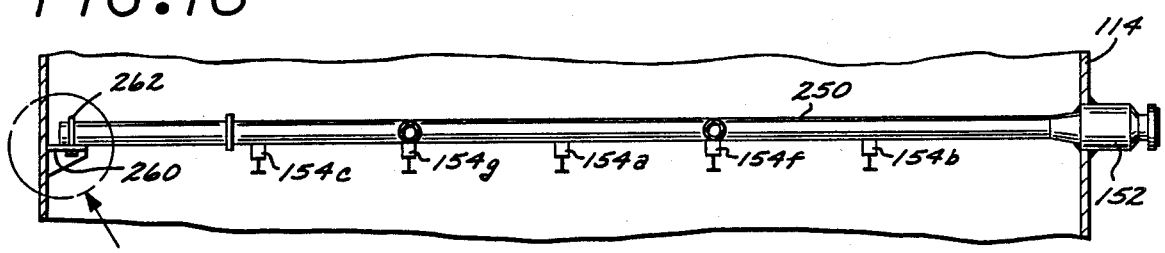
FIG. 16 is a fragmentary vertical section taken on the line 16—16 in FIG. 15.
Figure 17:
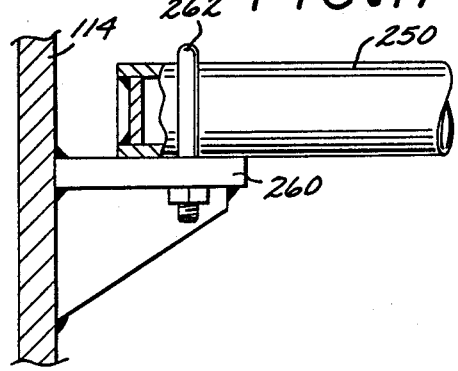
FIG. 17 is a further enlarged, fragmentary view of the encircled region designated 17 in FIG. 16.
Figure 18:
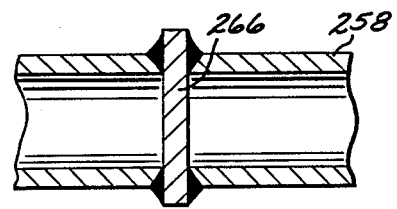
FIG. 18 is a further enlarged, fragmentary horizontal section taken on the line 18—18 in FIG. 15.

FIGS. 13 and 14 illustrate details of construction and mounting of demister 48 in high pressure flash crystallizer 30. Demister pad 134 is preferably of the York mesh type consisting of noncorrosive woven wires, as for example made from inconel 625. Demister pad 134 may alternatively be of the Brinks type. By way of example, demister pad 134 may be about 11 inches thick.

Demister pad 134 is seated in support tray 136 which has a flat annular upper portion 232 that is supported at its outer periphery on support ring 138. Support tray 136 also includes a down-turned cylindrical portion 233 and a radially inwardly turned annular lower flange portion 234. The wire mesh pad 134 has substantially the same thickness as the depth of cylindrical portion 233, and nests within support tray 136, resting against the lower flange portion 234. The principal operative portion of demister pad 134 is a wire mesh core 236, and this is encased in generally rigid perforate upper and lower containment sheet portions 238 and 240. As seen in FIG. 13, the annular support tray 136 may be fabricated in a plurality of connected portions.

Demister 48 is further supported by horizontal, parallel, vertically spaced, diametrical lower and upper I-beams 140 and 142, respectively, which are connected to tank shell 114 as by welds and/or bolts.

FIGS. 15-18 illustrate the upper spray nozzle distributor assembly 146 of the high pressure wash water spray system 50 in high pressure flash crystallizer 30. Input nozzle 152 connects to a diametrically placed primary distribution pipe 250. A pair of parallel secondary distribution pipes 252 and 254 extends orthogonally from one side of primary pipe 250 to proximate the wall of tank 114; while a complementary pair 256 and 258 of secondary distribution pipes extends orthogonally from the other side of primary pipe 250 to proximate the wall of tank 114. A spray head 154a on primary distribution pipe 250 is centrally located in tank 114, and a circular array of spray heads 154b-g is located on primary distribution pipe 250 and secondary distribution pipes 252, 254, 256 and 258. The end of primary pipe 250 opposite input nozzle 152, and all four of the free ends of secondary distribution pipes 252, 254, 256 and 258, are supported on support tabs 260 affixed to the wall of tank 114, and secured by U-bolt clamps 262. End portions of pipes 250, 252, 254, 256 and 258 not required for conducting wash water to the spray heads are blocked off by barrier plates 266.

In the upper spray nozzle distributor assembly 146 shown in FIGS. 15-18, all of the spray heads 154a-g face downwardly. The lower spray nozzle distributor assembly 144 is constructed in the same way, but with all of the spray heads directed upwardly. The lower and upper spray nozzle distributor assemblies 144a and 146a of low pressure flash crystallizer 30a are constructed in the same way.

FIGS. 19 and 20 illustrate a second form of baffle tray system according to the invention. This is a circular baffle tray system generally designated 270 consisting of an upper outer annular ring-shaped baffle tray 272, an intermediate inner disk-shaped baffle tray 274, and a lower outer annular ring-shaped baffle tray 276. The upper annular ring baffle tray 272 is seen in plan view from above in FIG. 19, while the central portion of the intermediate disk baffle tray 274 is also seen in plan from above in FIG. 19. As seen in FIG. 20, the upper and lower annular ring baffle trays 272 and 276, respectively, are similarly constructed.

Each of the upper and lower annular baffle trays 272 and 276, respectively, has a circular outer peripheral edge 278 and a circular inner free edge portion generally designated 280. The inner free edge portion 280 is constructed the same as the free edge portions 132 of the single segmental form of the invention previously described in detail in connection with FIGS. 7-12, except for being circular instead of straight. Thus, the circular free edge portion 280 includes an annular collector channel 282, an up-turned annular flange 284 serving as a weir, and a down-turned annular flange 286 depending below weir 284. Each of the ring-shaped upper and lower baffle trays 272 and 276 is supported at its outer edge on a support ring 288 secured to the wall of tank 114, and also on chordal support beams 290. Each of the upper and lower baffle trays 272 and 276 is preferably constructed of an annular array of wedge-shaped plate segments 292 having radial sides and arcuate outer and inner edges, plate segments 292 being connected by connecting bars 294.

Intermediate baffle tray 274 is a solid disk extending from a center section 296 outwardly to a circular outer edge portion generally designated 298. Outer edge portion 298 includes annular collector channel 300, up-turned annular flange or weir 302, and down-turned annular flange 304, thus again having the same construction as the free edge portions 132 described above in connection with FIGS. 7-12, but in circular form instead of straight form. Intermediate baffle tray 274 is preferably supported by means of a pair of parallel chordal support beams 306, and is constructed of an annular series of wedge-shaped plate segments 308 secured together by connecting bars 310. Connecting bars 310, and also connecting bars 294 on the upper and lower baffle trays 272 and 276, respectively, are on the top sides of the baffle trays, and serve the same functions as the connecting bars 202 described in detail hereinabove in connection with FIGS. 7-12.

Each of the three circular baffle trays 272, 274 and 276 preferably blanks off an amount of the cross-section of tank 114 in the range of from about 65 percent to about 75 percent, with a most preferred amount of about 70 percent. The spacing between the successive baffle trays 272, 274 and 276 is preferably such as to accelerate the flow of steam between the baffle trays to from about two to about four times the velocity of the rising steam below the baffle tray system 270. The baffle tray system 270 produces centripetal accelerations of the steam and centrifugal ejection of entrained brine and particulates in the same manner as described in detail in connection with FIG. 12 for the single segmental cut baffle system 46.

FIGS. 21 and 22 show a third form of baffle tray system according to the invention, which is a double segmental baffle system generally designated 312. It comprises a pair 314 of upper baffle segments which are diametrically opposed on opposite sides of tank 114; an intermediate diametrical baffle tray 315; and a lower pair 316 of diametrically opposed baffle tray segments which are rotationally oriented in registry with the upper pair 314.

Each of the upper and lower baffle segment pairs 314 and 316 comprises a diametrically opposing pair of chordal disk segments 318 each having a straight chordal free edge portion 320. The free edge portions 320 are of the same construction as the free edge portions 132 of the baffle plates described in detail hereinabove in connection with FIGS. 7-12, each having a straight collector channel 322, a straight up-turned flange or weir 324, a straight down-turned flange 326, a peripheral support ring 328, and a chordal support beam 330. Each of the chordal disk segments 318 consists of a series of parallel plates 332 attached to each other by connecting bars 334.

Intermediate baffle tray 316 may be considered as a diametrical disk portion having a pair of opposite segmental cuts, providing opposite free edge portions 336 which are straight, parallel to each other, and parallel to the free edge portions 320 of the upper and lower chordal disk segments 318. Thus, segmental flow paths for the steam are defined between the free edge portions 336 and the wall of tank 114. Each free edge portion 336 includes a straight collector channel 338, an up-turned flange 339, and a down-turned flange 340. Support ring segments 341 support the opposite ends of intermediate baffle tray 316, and a pair of support beams 342 are arranged parallel to the free edge portions 336. Intermediate baffle tray 316 is constructed of a series of parallel plates 344 attached by connecting bars 346. Accordingly, the construction of the double segmental baffle system 312 is the same as the construction of baffle trays 122, 124 and 126 described in detail hereinabove in connection with FIGS. 7-12, excepting only for the double segmental configuration of upper and lower baffle trays 314 and 316, respectively, and the centered location and configuration of intermediate baffle tray 315. Operation of the double segmental baffle system 312 is also the same as operation of the first form of baffle system 46 as described in detail in connection with FIG. 12, with similar centripetal accelerations of the flowing steam and centrifugal ejection of the entrained brine and particulates onto wall portions of tank 114 and bottom surfaces of the baffle trays. As with the other two forms of the invention described above, it is preferred that each of the upper baffle segment pair 314, intermediate baffle tray 315, and lower baffle segment pair 316 blank off from about 65 percent to about 75 percent of the cross-sectional area of tank 114, and most preferably about 70 percent of the cross-sectional area of tank 114. Also, as with the other forms of the invention, it is preferred that the vertical spacing between the baffle trays be such as to accelerate the flow velocity of the steam to about two to four times the flow velocity of the steam as it is rising through tank 114 below the baffle tray system.

Figure 23:
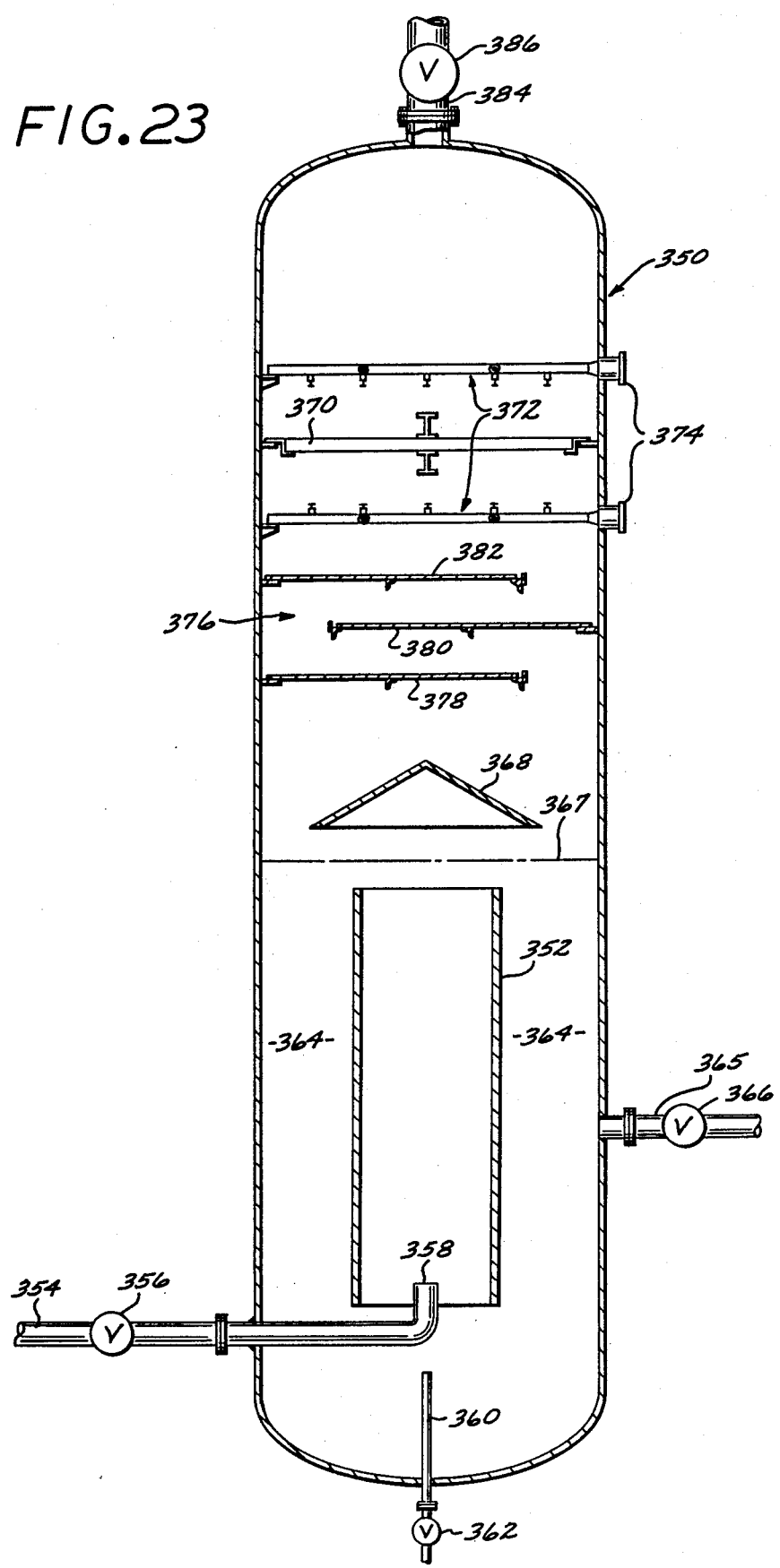
FIG. 23 is a vertical diametrical sectional view similar to FIG. 2, but partly in elevation, illustrating the preferred form of the invention embodied within an internal draft tube-type flash crystallizer.

FIG. 23 illustrates the baffle tray system of the present invention incorporated into a flash crystallizer having an Featherstone U.S. Pat. No. 4,429,535. The internal draft tube form of the invention as shown in FIG. 23 is incorporated into a high pressure crystallizer generally designated 350 which corresponds in all respects to the high pressure flash crystallizer 30 of the external draft tube form of the invention other than the brine entry and exit, and the seed particle entry. Thus, flash crystallizer 350 has an axially centered vertical internal draft tube 352, and the input conduit 354 from he production well, having control valve 356 therein, enters the lower portion of flash crystallizer 350 and has an injection orifice 358 which is centrally located in the lower end of draft tube 352. A silica seed injection conduit 360 having a seed flow control valve 362 therein enters through the bottom of flash crystallizer 350 and releases silica seed particles below draft tube 352 for upward flow into draft tube 352 and into the body 364 of recirculating brine. Brine outlet conduit 365 has a control valve 366 therein which controls the surface level 367 of the body 364 of recirculating brine. An axially centered, downwardly cupped conical deflector 368 minimizes geysering which would otherwise be likely because of the strong two-phase (brine and steam) upwelling through internal draft tube 352.

The apparatus in the upper portion of flash crystallizer 350 is the same as that in the first form of the invention, shown in FIGS. 1-3 and 7-18, and described in detail hereinabove in connection with those figures. Thus, there is a demister 370 corresponding to demister 48, a wash water spray system 372 corresponding to wash water spray system 50, and a baffle tray system 376 corresponding to baffle tray system 46 including lower, intermediate and upper baffle trays 378, 380 and 382 corresponding to respective baffle trays 122, 124 and 126. At the top of flash crystallizer 350 is steam output conduit 384 having control valve 386 therein, corresponding respectively to steam output conduit 52 and its control valve 54. Although the baffle tray system 376 is shown in an internal draft tube high pressure crystallizer, it is to be understood that it is equally applicable to a low pressure flash crystallizer. It is likewise to be understood that the second form of baffle tray system shown in FIGS. 19 and 20 and the third form of baffle tray system shown in FIGS. 21 and 22 are equally applicable to internal draft tube-type flash crystallizers.

The operation of the baffle tray system 376 shown in FIG. 23 is the same as described hereinabove in detail in connection with FIG. 12. The presence of baffle tray system 376 in the internal draft tube-type flash crystallizer 350 is of particular importance because of the likelihood that a substantial quantity of brine droplets and particulates will be entrained in the upwardly flowing steam released from the surface 367 of the body 364 of brine immediately above internal draft tube 352.

While the present invention has been described with reference to presently preferred embodiments, it is to be understood that various modifications or alterations may be made by those skilled in the art without departing from the scope and spirit of the invention as set forth in the appended claims.

I claim:

1. In a geothermal electric power generating plant of the type wherein a flow stream of hot geothermal brine is partially flashed to steam for turbine motive power, a system for removing entrained materials from said flashed steam, which comprises:
   at least one flash crystallizer vessel having a lower portion which receives said brine flow stream and in which a portion thereof is flashed to steam, and an upper portion through which said flashed steam flows upwardly and from which said flashed steam is conducted to steam turbine means; and
   a baffle tray system within said upper portion of said vessel comprising a plurality of generally horizontal, generally vertically spaced baffle trays that define a sinuous upward flow path for said flashed steam which produces a series of substantial centripetal accelerations of said upwardly flowing steam so as to centrifugally separate said entrained materials from the steam onto surface portions of said baffle trays and wall portions of said upper portion of said vessel.

2. A system according to claim 1, which comprises at least three of said baffle trays.

3. A system according to claim 2, wherein each of said baffle trays blocks off in the range of from about 65 percent to about 75 percent of the generally horizontal cross-sectional area of said upper portion of said vessel.

4. A system according to claim 2, wherein each of said baffle trays blocks off about 70 percent of the generally horizontal cross-sectional area of said upper portion of said vessel.

5. A system according to claim 2, wherein the generally vertical spacing between said baffle trays is such as to cause the flow velocity of said flashed steam between each adjacent pair of said baffle trays to be at an accelerated rate in the range of from about two to about four times the upward flow of said flashed steam in said vessel below said baffle trays.

6. A system according to claim 5, wherein each of said baffle trays blocks off in the range of from about 65 percent to about 75 percent of the generally horizontal cross-sectional area of said upper portion of said vessel.

7. A system according to claim 5, wherein each of said baffle trays blocks off about 70 percent of the generally horizontal cross-sectional area of said upper portion of said vessel.

8. A system according to claim 2, which comprises water spray means located in said upper portion of said vessel above said baffle tray system for causing water to rain down onto said baffle tray system and cascade downwardly through said baffle tray system and into said brine flow stream in said lower portion of said vessel;
   said separated entrained materials being blown into said cascading water by said flowing steam so that said separated entrained materials will flow downwardly into said brine flow stream with said cascading water.

9. A system according to claim 8, wherein said baffle tray system provides a substantially complete barrier across the generally horizontal cross-section of said vessel for catching substantially all of said water for utilization in said baffle tray system.

10. A system according to claim 8, which comprises generally flat, generally horizontal demister means located in said upper portion of said vessel above said baffle tray system;
    said spray means being arranged to spray said water as wash water onto said demister means, said water raining down from said demister means onto said baffle tray system.

11. A system according to claim 10, wherein said spray means comprises spray nozzle distributor means generally vertically spaced from at least one of the upper and lower sides of said demister means.

12. A system according to claim 11, wherein said spray nozzle distributor means is located both above and below said demister means.

13. A system according to claim 2, wherein said vessel has double tangential input nozzle means through which said brine flow stream is received in said lower portion of said vessel;
    said nozzle means preventing geysering of the brine and flashing steam as they enter said vessel, and minimizing the quantity of said entrained materials that said baffle tray system is required to separate from said upwardly flowing steam.

14. A system according to claim 2, wherein said flash crystallizer is of the external draft tube type.

15. A system according to claim 2, wherein said flash crystallizer is of the internal draft tube type.

16. A system according to claim 2, wherein said baffle tray system provides a substantially complete 360° barrier adjacent the wall of said vessel for blocking geothermal brine that may crawl up the wall of said vessel under the impetus of said upwardly flowing steam.

17. A system according to claim 2, wherein each of said three baffle trays has free edge means spaced from the wall of said vessel and past which said upwardly flowing flashed steam flows; and
    upwardly directed flange means on said free edge means of at least the intermediate and lower of said three baffle trays defining weir means for collecting liquid on the upper surface of each of these two baffle trays;
    said liquid spilling over said weirs and cascading downwardly through the lower portion of said baffle tray system and into said brine flow stream in said lower portion of said vessel.

18. A system according to claim 17, wherein said free edge means on said intermediate baffle tray overlies said lower baffle tray, whereby said liquid which spills over said weir of said intermediate baffle tray cascades down onto the top of said lower baffle tray.

19. A system according to claim 17, which further comprises upwardly directed flange means on said free edge means of the upper of said three baffle trays; and
  water spray means in said upper portion of said vessel above said baffle tray system for causing water to rain down onto said baffle tray system;
  some of said water collecting in a sheet on the upper surface of said upper baffle tray and spilling over its said weir and cascading downwardly through said baffle system wherein it is joined by said liquid from said intermediate and lower baffle trays and flows with said liquid into said brine flow stream in said lower portion of said vessel.

20. A system according to claim 19, wherein free edge means on said upper baffle tray overlies said intermediate baffle tray, and said free edge means on said intermediate baffle tray overlies said lower baffle tray, whereby said water which spills over said weir on said upper baffle tray cascades down onto said intermediate baffle tray where it joins said liquid on said intermediate baffle tray, and then successively cascades with said liquid downwardly from said intermediate baffle tray onto said lower baffle tray and downwardly from said lower tray into said lower portion of said vessel.

21. A system according to claim 2, wherein each of said three baffle trays has free edge means spaced from the wall of said vessel and past which said upwardly flowing flashed steam flows; and
  down-turned flange means on said free edge means of each of said three baffle trays;
  some of said separated entrained materials flowing outwardly, under the impetus of the flowing separated steam, along the bottoms of said baffle trays to said free edge means, said flange means deflecting such outwardly flowing materials downwardly away from the direction of steam flow.

22. A system according to claim 17, which comprises down-turned flange means on said free edge means of each of said three baffle trays;
  some of said separated entrained materials flowing outwardly, under the impetus of the flowing separated steam, along the bottoms of said baffle trays to said free edge means, said flange means deflecting such outwardly flowing materials downwardly away from the direction of steam flow;
  said outwardly flowing separated entrained materials merging with said cascading flows from said intermediate and lower baffle trays at the lower edges of the respective said flange means.

23. A system according to claim 18, which comprises down-turned flange means on said free edge means of each of said three baffle trays;
  some of said separated entrained materials flowing outwardly, under the impetus of the flowing separated steam, along the bottoms of said baffle trays to said free edge means, said flange means deflecting such outwardly flowing materials downwardly away from the direction of steam flow;
  said outwardly flowing separated entrained materials merging with said cascading flows from said intermediate and lower baffle trays at the lower edges of the respective said flange means.

24. A system according to claim 19, which comprises down-turned flange means on said free edge means of each of said three baffle trays;
  some of said separated entrained materials flowing outwardly, under the impetus of the flowing separated steam, along the bottoms of said baffle trays to said free edge means, said flange means deflecting such outwardly flowing materials downwardly away from the direction of steam flow;
  said outwardly flowing entrained materials merging with said cascading flows from said three baffle trays at the lower edges of the respective flange means.

25. A system according to claim 20, which comprises down-turned flange means on said free edge means of each of said three baffle trays;
  some of said separated entrained materials flowing outwardly, under the impetus of the flowing separated steam, along the bottoms of said baffle trays to said free edge means, said flange means deflecting such outwardly flowing materials downwardly away from the direction of steam flow;
  said outwardly flowing entrained materials merging with said cascading flows from said three baffle trays at the lower edges of the respective flange means.

26. A system according to claim 2, wherein each of said three baffle trays is generally disk-shaped with its periphery supported on and substantially sealed to the wall of said vessel;
  each of said three baffle trays having a single segmental cutout with generally chordal free edge portion, a steam flow aperture being defined between said free edge portion and the wall of said vessel; and
  the upper and lower of said three baffle trays being similarly rotationally oriented with their said free edge portions in overlying, generally parallel relationship, and the intermediate said baffle tray being oriented about 180° rotationally offset from the orientations of said upper and lower baffle trays.

27. A system according to claim 2, wherein each of the upper and lower of said three baffle trays comprises a generally flat annular ring having an outer periphery supported on and substantially sealed to the wall of said vessel and a generally circular inner peripheral free edge portion defining a steam flow aperture; and
  the intermediate said baffle tray being generally disk-shaped and supported by support means connecting it to the wall of said vessel, said intermediate baffle tray having a generally annular free edge portion that is generally coaxial with the axis of said vessel and spaced radially inwardly from the wall of said vessel, with a steam flow aperture defined between said free edge portion and the wall of said vessel.

28. A system according to claim 2, wherein each of the upper and lower of said three baffle trays comprises a pair of opposing generally chordal disk segments having spaced-apart, generally parallel, generally chordal free edge portions defining a generally diametrical steam flow slot; and
  the intermediate of said baffle trays being generally disk-shaped with its periphery supported on and substantially sealed to the wall of said vessel, and having a pair of generally diametrically opposite single segmental cutouts each having a generally chordal free edge portion, with a pair of steam flow apertures defined between said free edge portions and the wall of said vessel, said intermediate baffle tray being rotationally oriented so that its said free edge portions are generally parallel to said free edge portions of said upper and lower baffle trays.

29. A system according to claim 26, wherein each of said baffle trays comprises a series of elongated, generally flat, generally parallel plate segments, adjacent said plate segments being connected by elongated connecting bars on top of said plate segments and oriented generally orthogonal to said free edge portions.

30. A system according to claim 29, which comprises upwardly directed flange means on each of said free edge portions defining weir means for collecting liquid on the upper surfaces of said baffle trays.

31. A system according to claim 27, wherein each of said baffle trays comprises a generally annular series of generally wedge-shaped plate segments, adjacent said plate segments being connected by elongated connecting bars on top of said plate segments and oriented generally orthogonal to said free edge portions.

32. A system according to claim 31, which comprises upwardly directed flange means on each of said free edge portions defining weir means for collecting liquid on the upper surfaces of said baffle trays.

33. A system according to claim 28, wherein each of said baffle trays comprises a series of elongated, generally flat, generally parallel plate segments, adjacent said plate segments being connected by elongated connecting bars on top of said plate segments and oriented generally orthogonal to said free edge portions.

34. A system according to claim 33, which comprises upwardly directed flange means on each of said free edge portions defining weir means for collecting liquid on the upper surfaces of said baffle trays.

35. In a geothermal electric power generating plant of the type wherein a flow stream of hot geothermal brine is partially flashed to steam for turbine motive power, a method for removing entrained materials from said flashed steam, which comprises:
flowing said brine flow stream through the lower portion of a flash crystallizer vessel and flashing a portion of said brine flow stream to steam in said lower portion, said flashed steam flowing upwardly through an upper portion of said vessel and being conducted from said vessel to steam turbine means; and
passing said flashed steam upwardly through a baffle tray system in said upper portion of said vessel comprising a plurality of generally horizontal, generally vertically spaced baffle trays that define a sinuous flow path for said flashed steam so as to apply a series of substantial centripetal accelerations to said upwardly flowing steam and thereby centrifugally separate said entrained materials from the steam onto surface portions of said baffle trays and wall portions of said upper portion of said vessel.

36. A method according to claim 35, which comprises passing said flashed steam upwardly through a sinuous path comprising at least three of said baffle trays.

37. A method according to claim 36, which comprises blocking off with each of said baffle trays in the range of from about 65 percent to about 75 percent of the generally horizontal cross-sectional area of said upper portion of said flash crystallizer vessel.

38. A method according to claim 36, which comprises blocking off with each of said baffle trays about 70 percent of the generally horizontal cross-sectional area of said upper portion of said flash crystallizer vessel.

39. A method according to claim 36, which comprises providing a generally vertical spacing between said baffle trays such as to cause the flow velocity of said flashed steam between each adjacent pair of said baffle trays to be at an accelerated rate in the range of from about two to about four times the upward flow of said flashed steam in said vessel below said baffle trays.

40. A method according to claim 39, which comprises blocking off with each of said baffle trays in the range of from about 65 percent to about 75 percent of the generally horizontal cross-sectional area of said upper portion of said vessel.

41. A method according to claim 39, which comprises blocking off with each of said baffle trays about 70 percent of the generally horizontal cross-sectional area of said upper portion of said vessel.

42. A method according to claim 36, which comprises raining water down onto said baffle tray system and cascading said water downwardly through said baffle tray system and into said brine flow stream in said lower portion of said vessel;
said separated entrained materials being blown into said cascading water by said flowing steam so that said separated entrained materials will flow downwardly with said cascading water into said brine flow stream.

43. A method according to claim 42, which comprises arranging said baffle tray system so that it provides a substantially complete barrier across the generally horizontal cross-section of said vessel for catching substantially all of said water for utilization in said baffle tray system.

44. A method according to claim 42, which comprises spraying said water as wash water onto demister means located in said vessel above said baffle tray system, said water raining down from said demister means onto said baffle tray system.

45. A method according to claim 36, which comprises flowing said brine flow stream into said lower portion of said vessel in a double tangential flow stream, so as to prevent geysering of the brine and flashing steam as they enter said vessel, and so as to minimize the quantity of said entrained materials that are required to be separated from said upwardly flowing steam in said baffle tray system.

46. A method according to claim 36, wherein said flash crystallizer is of the external draft tube type.

47. A method according to claim 36, wherein said flash crystallizer is of the internal draft tube type.

48. A method according to claim 36, which comprises arranging said baffle tray system so that it provides a substantially complete 360° barrier adjacent the wall of said vessel for blocking geothermal brine that may crawl up the wall of said vessel under the impetus of said upwardly flowing steam.

49. A method according to claim 36, wherein each of said three baffle trays has free edge means spaced from the wall of said flash crystallizer vessel and past which said upwardly flowing flashed steam flows; and
collecting liquid on the upper surfaces of at least the intermediate and lower of said three baffle trays and spilling said liquid over their respective said free edge means so as to cascade downwardly through the lower portion of said baffle tray system and into said brine flow stream in said lower portion of said vessel.

50. A method according to claim 49, wherein said intermediate and lower baffle trays are arranged so that said free edge means on said intermediate baffle tray overlies said lower baffle tray so that said liquid which spills over said free edge portion of said intermediate baffle tray cascades down onto the top of said lower baffle tray.

51. A method according to claim 49, which further comprises spraying water from above down onto the upper of said three baffle trays and collecting said water on the upper surface of said upper baffle tray, and spilling said water over the respective said free edge means to cascade downwardly through said baffle tray system wherein it is joined by said liquid and flows with said liquid into said brine flow stream in said lower portion of said vessel.

52. A method according to claim 51, wherein said baffle trays are arranged so that said free edge means on said upper baffle tray overlies said intermediate baffle tray and said free edge means on said intermediate baffle tray overlies said lower baffle tray, whereby said water which spills from said upper baffle tray cascades down onto said intermediate baffle tray where it joins said liquid on said intermediate baffle tray, and then successively cascades with said liquid downwardly from said intermediate baffle tray down onto said lower baffle tray and downwardly from said lower tray into said lower portion of said vessel.

53. A method according to claim 36, wherein each of said three baffle trays has free edge means spaced from the wall of said vessel and past which said upwardly flowing steam flows; and
deflecting downwardly away from the direction of steam flow, by means of down-turned flange means on said free edge means of each of said three baffle trays, some of said separated entrained materials flowing outwardly under the impetus of the flowing separated steam along the bottoms of said baffle trays to said free edge means.

54. A method according to claim 49, which comprises deflecting downwardly away from the direction of steam flow, by means of down-turned flange means on said free edge means of each of said three baffle trays, some of said separated entrained materials flowing outwardly under the impetus of the flowing separated steam along the bottoms of said baffle trays to said free edge means;
said outwardly flowing separated entrained materials merging with said cascading flows down from said intermediate and lower baffle trays at the lower edges of the respective said flange means.

55. A method according to claim 50, which comprises deflecting downwardly away from the direction of steam flow, by means of down-turned flange means on said free edge means of each of said three baffle trays, some of said separated entrained materials flowing outwardly under the impetus of the flowing separated steam along the bottoms of said baffle trays to said free edge means;
said outwardly flowing separated entrained materials merging with said cascading flows down from said intermediate and lower baffle trays at the lower edges of the respective said flange means.

56. A method according to claim 51, which comprises deflecting downwardly away from the direction of steam flow, by means of down-turned flange means on said free edge means of each of said three baffle trays, some of said separated entrained materials flowing outwardly under the impetus of the flowing separated steam along the bottoms of said baffle trays to said free edge means;
said outwardly flowing separated entrained materials merging with said cascading flows from said three baffle trays at the lower edges of the respective said flange means.

57. A method according to claim 52, which comprises deflecting downwardly away from the direction of steam flow, by means of down-turned flange means on said free edge means of each of said three baffle trays, some of said separated entrained materials flowing outwardly under the impetus of the flowing separated steam along the bottoms of said baffle trays to said free edge means;
said outwardly flowing separated entrained materials merging with said cascading flows down from said three baffle trays at the lower edges of the respective said flange means.

58. A method according to claim 36, which comprises first deflecting said upwardly flowing flashed steam so that it flows generally horizontally between the lower and intermediate of said three baffle trays from one side of said vessel to the generally diametrically opposite side of said vessel, and then reversing the flow of the steam so that it flows generally horizontally between the intermediate and upper of said three baffle trays from said opposite side back to said one side of said vessel.

59. A method according to claim 36, which comprises first passing said upwardly flowing steam through a generally circular orifice in the lower of said three baffle trays that is generally axially centered in said vessel, next passing said steam generally horizontally radially outwardly in a generally circular pattern between said lower and the intermediate of said three baffle trays, then passing said steam generally horizontally radially inwardly in a generally circular pattern between said intermediate and the upper of said three baffle trays, and finally passing said steam upwardly out of said baffle tray system through a generally circular orifice in said upper baffle tray that is generally axially centered in said vessel.

60. A method according to claim 36, which comprises first passing said upwardly flowing steam through a generally diametrical slot in the lower of said three baffle trays, next passing said steam generally horizontally outwardly from said slot between said lower baffle tray and the intermediate of said three baffle trays, then reversing the flow of said steam so that it flows generally horizontally inwardly between the intermediate and upper of said three baffle trays, and finally passing said steam upwardly out of said baffle tray system through a generally diametrical slot in said upper baffle tray that is generally parallel to said generally diametrical slot in said lower baffle tray.

61. A method according to claim 49, which comprises maintaining said collected liquid on each of said intermediate and lower baffle trays as a substantially continuous sheet by providing a series of ribs on the upper surface of each of said intermediate and lower baffle trays which are directed generally orthogonally to said free edge means of the respective said intermediate and lower baffle trays.

62. A method according to claim 51, which comprises maintaining the liquid collected on each of said three baffle trays as a substantially continuous sheet by providing a series of ribs on the upper surface of each of said three baffle trays which are directed generally orthogonally to said free edge means of the respective said baffle trays.

* * * * *